United States Patent
Mitchell et al.

(10) Patent No.: US 9,854,501 B2
(45) Date of Patent: Dec. 26, 2017

(54) RADIO SPECTRUM UTILIZATION

(71) Applicant: Microsoft Corporation, Redmond, WA (US)

(72) Inventors: Paul W. A. Mitchell, Seattle, WA (US); Paul W. Garnett, Albany, NY (US); Amer A. Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/828,820

(22) Filed: Mar. 14, 2013

(65) Prior Publication Data
US 2014/0274090 A1 Sep. 18, 2014

(51) Int. Cl.
| | |
|---|---|
| *H04W 40/20* | (2009.01) |
| *H04W 24/02* | (2009.01) |
| *H04W 72/04* | (2009.01) |
| *H04W 72/08* | (2009.01) |

(52) U.S. Cl.
CPC .......... *H04W 40/20* (2013.01); *H04W 24/02* (2013.01); *H04W 72/048* (2013.01); *H04W 72/0453* (2013.01); *H04W 72/082* (2013.01)

(58) Field of Classification Search
CPC ... H04W 40/20; H04W 48/20; H04W 72/082; H04W 72/048; H04W 72/0453; H04W 24/02
USPC ................................ 455/450, 452.1
See application file for complete search history.

(56) References Cited

U.S. PATENT DOCUMENTS

| | | | |
|---|---|---|---|
| 6,304,756 B1 * | 10/2001 | Hebeler et al. .............. | 455/450 |
| 6,567,665 B1 | 5/2003 | Kissee | |
| 7,013,158 B1 | 3/2006 | Cook | |
| 7,876,786 B2 | 1/2011 | Bahl et al. | |
| 8,185,120 B2 | 5/2012 | Hassan et al. | |
| 8,311,548 B2 | 11/2012 | Zumsteg et al. | |
| 8,437,790 B1 | 5/2013 | Hassan et al. | |
| 8,467,359 B2 | 6/2013 | McCann et al. | |
| 8,483,155 B1 | 7/2013 | Banerjea et al. | |
| 8,507,293 B2 | 8/2013 | Ward et al. | |

(Continued)

FOREIGN PATENT DOCUMENTS

| | | |
|---|---|---|
| CN | 1887023 A | 12/2006 |
| EP | 1740001 A1 | 1/2007 |

(Continued)

OTHER PUBLICATIONS

Bogucka, et al., "Secondary spectrum trading in TV white spaces", Retrieved at <<http://ieeexplore.ieee.org/stamp/stamp.jsp?tp=&arnumber=6353691>>IEEE Communications Magazine, vol. 50, Issue. 11, Nov. 2012, pp. 9.

(Continued)

*Primary Examiner* — Dinh P Nguyen
(74) *Attorney, Agent, or Firm* — Rainier Patents, P.S.

(57) ABSTRACT

The concepts relate to radio channel utilization. One example can monitor a location of a mobile device that has cellular capabilities. The example can identify a set of channels that are available to the mobile device at the location. The example can also send the set of channels to the mobile device with a suggestion for the mobile device to utilize one or more of the channels of the set to accomplish data communication rather than using the cellular capabilities.

22 Claims, 11 Drawing Sheets

(56) References Cited

U.S. PATENT DOCUMENTS

| | | | |
|---|---|---|---|
| 8,509,695 B2 | 8/2013 | King et al. | |
| 8,588,158 B2 | 11/2013 | Kim et al. | |
| 8,605,741 B2 | 12/2013 | Kim et al. | |
| 8,767,763 B2 | 7/2014 | Kim et al. | |
| 9,014,738 B2 | 4/2015 | Gebert | |
| 9,025,536 B2 | 5/2015 | Krishnaswamy | |
| 2001/0048746 A1 | 12/2001 | Dooley | |
| 2002/0036989 A1 | 3/2002 | Payton | |
| 2002/0107709 A1 | 8/2002 | Colson et al. | |
| 2002/0107811 A1 | 8/2002 | Jain et al. | |
| 2004/0043772 A1* | 3/2004 | Quirke | H04W 28/18 455/456.1 |
| 2004/0248585 A1 | 12/2004 | Karacaoglu | |
| 2004/0259546 A1 | 12/2004 | Balachandran et al. | |
| 2007/0275730 A1 | 11/2007 | Bienas et al. | |
| 2008/0036647 A1 | 2/2008 | Jung | |
| 2008/0113787 A1 | 5/2008 | Alderucci et al. | |
| 2008/0130519 A1 | 6/2008 | Bahl et al. | |
| 2009/0047984 A1 | 2/2009 | Gollamudi et al. | |
| 2009/0061892 A1 | 3/2009 | Lee et al. | |
| 2009/0083800 A1 | 3/2009 | Puthalapat et al. | |
| 2009/0144791 A1 | 6/2009 | Huffman et al. | |
| 2009/0181621 A1 | 7/2009 | Kimura | |
| 2009/0196180 A1 | 8/2009 | Bahl et al. | |
| 2009/0243796 A1 | 10/2009 | Tieman | |
| 2009/0247201 A1 | 10/2009 | Ye et al. | |
| 2010/0048234 A1 | 2/2010 | Singh | |
| 2010/0136994 A1 | 6/2010 | Kim et al. | |
| 2010/0246506 A1* | 9/2010 | Krishnaswamy | H04W 72/085 370/329 |
| 2010/0309806 A1 | 12/2010 | Wu et al. | |
| 2010/0328139 A1 | 12/2010 | Iwasaki et al. | |
| 2011/0014936 A1 | 1/2011 | Kim | |
| 2011/0039495 A1 | 2/2011 | Sawai et al. | |
| 2011/0059701 A1 | 3/2011 | Fujii et al. | |
| 2011/0076959 A1 | 3/2011 | Selen et al. | |
| 2011/0080882 A1* | 4/2011 | Shu et al. | 370/329 |
| 2011/0090887 A1 | 4/2011 | Kim et al. | |
| 2011/0096770 A1 | 4/2011 | Henry | |
| 2011/0164186 A1 | 7/2011 | Sadek et al. | |
| 2011/0164580 A1 | 7/2011 | Keon | |
| 2011/0182257 A1 | 7/2011 | Raveendran et al. | |
| 2011/0205910 A1 | 8/2011 | Soomro et al. | |
| 2011/0223877 A1 | 9/2011 | Tillman et al. | |
| 2011/0223931 A1 | 9/2011 | Buer et al. | |
| 2011/0228666 A1 | 9/2011 | Barbieri et al. | |
| 2011/0237238 A1 | 9/2011 | Hassan et al. | |
| 2011/0243078 A1 | 10/2011 | Kim | |
| 2011/0264780 A1 | 10/2011 | Reunamaki et al. | |
| 2011/0287802 A1 | 11/2011 | Ma et al. | |
| 2011/0299481 A1 | 12/2011 | Kim et al. | |
| 2011/0299509 A1 | 12/2011 | Wang et al. | |
| 2011/0306375 A1 | 12/2011 | Chandra et al. | |
| 2011/0307612 A1 | 12/2011 | Junell et al. | |
| 2011/0310840 A1* | 12/2011 | Kennedy | H04W 48/14 370/331 |
| 2011/0310865 A1 | 12/2011 | Kennedy et al. | |
| 2011/0319129 A1 | 12/2011 | Bhat et al. | |
| 2012/0009874 A1* | 1/2012 | Kiukkonen | H04W 16/14 455/41.2 |
| 2012/0052891 A1 | 3/2012 | Irnich et al. | |
| 2012/0094681 A1 | 4/2012 | Freda et al. | |
| 2012/0120892 A1 | 5/2012 | Freda et al. | |
| 2012/0122477 A1 | 5/2012 | Sadek et al. | |
| 2012/0148068 A1 | 6/2012 | Chandra et al. | |
| 2012/0163309 A1 | 6/2012 | Ma et al. | |
| 2012/0182883 A1 | 7/2012 | Junell et al. | |
| 2012/0184318 A1* | 7/2012 | Lee | H04W 16/14 455/515 |
| 2012/0195230 A1 | 8/2012 | Monzat de Saint Julien et al. | |
| 2012/0230250 A1 | 9/2012 | Kasslin et al. | |
| 2012/0238304 A1 | 9/2012 | Lambert et al. | |
| 2012/0281594 A1 | 11/2012 | Stewart et al. | |
| 2012/0300761 A1 | 11/2012 | Vasko et al. | |
| 2012/0307685 A1 | 12/2012 | Kim et al. | |
| 2013/0039212 A1 | 2/2013 | Li et al. | |
| 2013/0070605 A1 | 3/2013 | Ghosh et al. | |
| 2013/0114480 A1 | 5/2013 | Chapman et al. | |
| 2013/0195096 A1 | 8/2013 | Kim et al. | |
| 2013/0204677 A1 | 8/2013 | Wang | |
| 2013/0223357 A1 | 8/2013 | Jones et al. | |
| 2013/0301544 A1 | 11/2013 | Drucker | |
| 2014/0066059 A1 | 3/2014 | Patil et al. | |
| 2014/0146723 A1 | 5/2014 | Chang | |
| 2014/0274009 A1 | 9/2014 | Do et al. | |
| 2014/0328294 A1 | 11/2014 | Malkov et al. | |
| 2015/0119059 A1 | 4/2015 | Miao et al. | |
| 2016/0081014 A1 | 3/2016 | Hassan et al. | |

FOREIGN PATENT DOCUMENTS

| | | |
|---|---|---|
| EP | 2224771 A1 | 9/2010 |
| GB | 2477916 A | 8/2011 |
| GB | 2492967 A | 1/2013 |
| WO | 2006/117587 A1 | 11/2006 |
| WO | 2010022156 A2 | 2/2010 |
| WO | 2010108439 A1 | 9/2010 |
| WO | 2011053078 A1 | 5/2011 |
| WO | 2011062722 A1 | 5/2011 |
| WO | 2012035190 A1 | 3/2012 |
| WO | 2012087694 A1 | 6/2012 |
| WO | 2012/118490 A1 | 9/2012 |
| WO | 20120125631 A1 | 9/2012 |
| WO | 2012/171456 A1 | 12/2012 |
| WO | 2012174152 A2 | 12/2012 |

OTHER PUBLICATIONS

Fatemieh, et al., "Using Classification to Protect the Integrity of Spectrum Measurements in White Space Networks", Retrieved at <<http://www.cs.illinois.edu-moinzad1/omid/pubs/FatemiehFCG11.pdf>>, In the Proceedings of the 18th Annual Network and Distributed System Security Symposium, Feb. 2011, pp. 17.

Fazeli-Dehkordy, et al., "Wide-Band Collaborative Spectrum Search Strategy for Cognitive Radio Networks", Retrieved at <<http://ieeexplore.ieee.org/stamp/stamp.jsp?arnumber=05765552>>, Proceedings of IEEE Transactions on Signal Processing, vol. 59, No. 8, Aug. 2011, pp. 3903-3914.

Feng, et al., "Database-Assisted Multi-AP Network on TV White Spaces: Architecture, Spectrum, Allocation and AP Discovery", Retrieved at <<http:??ieeexplore.ieee.org/stamp/stamp.jsp?tp=&arnumber=5936215>>, Symposium on New Frontiers in Dynamic Spectrum Access Networks, May 3, 2011, pp. 12.

Ghosh, et al., "Coexistence Challenges for Heterogeneous Cognitive Wireless Networks in TV White Spaces", Retrieved at <<http://www.ee.washington.edu/research/funlab/Publications/2011Coexistence_in_Wireless_Cognitive_Heterogeneous_Networks_05_19_sroy.pdf>>, In the Proceeding of IEEE Wireless Communications, Aug. 2011, pp. 13.

Gurney, et al., "Geo-location Database Techniques for Incumbent Protection in the TV White Space", Retrieved at <<http://ieeexplore.ieee.org/stamp/stamp.jsp?tp=&arnumber=4658242>>, Proceedings of 3rd IEEE Symposium on New Frontiers in Dynamic Spectrum Access Networks, Oct. 14, 2008, pp. 9.

"International Search Report & Written Opinion for PCT Application No. PCT/US2014/020951", Mailed Date: Jun. 2014, Filed Date: Mar. 6, 2014, 12 Pages.

"International Search Report & Written Opinion" from PCT Application No. PCT/US2013/058348, Mailed Date: Nov. 18, 2013, Filed Date: Sep. 6, 2013, 12 Pages.

"International Search Report & Written Opinion" from PCT Application No. PCT/US2013/0452841, Mailed Date: Sep. 18, 2013, Filed Date: Jun. 12, 2013, 14 Pages.

Kokkinene, Heikki, "Propagating Thoughts", Retrieved at <<http://www.fairspectrum.com/propagating-thoughts>>, May 20, 2012, pp. 7.

(56) References Cited

OTHER PUBLICATIONS

Min, et al., "Detection of Small-Scale Primary Users in Cognitive Radio Networks", Retrieved at <<http://ieeexplore.ieee.org/stamp/stamp.jsp?tp=&arnumber=5701689>>, Proceedings of IEEE Journal of Selected Areas in Communications, vol. 29, Issue 2, Feb. 2011, pp. 13.

Na, et al., "Policy-based Dynamic Channel Selection Architecture for Cognitive Radio Networks", In Proceedings of Second International Conference on Communications and Networking in China, Aug. 22, 2007, 5 Pages.

"Outdoor heterogeneous ISM/TVWS VSN testbed", Retrieved at <<http://www.crew-project.eu/vsn>>,Retrieved Date: Feb. 21, 2012, pp. 5.

Shellhammer, et al., "Technical Challenges for Cognitive Radio in the TV White Space Spectrum", Retrieved at <<http://ita.ucsd.edu/workshop/09/files/paper/paper_1500.pdf>>, Information Theory and Applications Workshop, 2009, Feb. 8, 2009, pp. 323-333.

Simic et al., "Wi-Fi, but Not on Steroids: Performance Analysis of a Wi-Fi-Like Network Operating in TVWS under Realistic Conditions," Proceedings of the IEEE International Conference on Communications, 2012, pp. 1533-1538.

TV White Spaces: A Global Momentum towards Commercialization:, Retrieved at <<http://whitespace.i2r.a-star.edu.sg/TVWS_Workshop/Slides/8%209%2010_Inside%20the%20nerve%20Centre%20-%20COMPLETE%20SESSION.pdf>>, Oct. 10, 2012, pp. 22.

Viola, Catherine, "TV white spaces: a new option for smart grid communications?", Retrieved at <<http://www.smartgridopinions.com/article/tv-white-spaces-new-option-smart-grid-communications>>, Sep. 27, 2011, pp. 09-27.

Wang, et al., "Channel Assignment of Cooperative Spectrum Sensing in Multi-Channel Cognitive Radio Networks", Retrieved at <<http://ieeexplore.ieee.org/stamp/stamp.jsp?arnumber=05962509>>,Proceedings of IEEE International Conference on Communications (ICC), 2011, Jun. 5, 2011, pp. 1-5.

"Requirement for Election/Restriction," Mailed Date: Jun. 10, 2014, From U.S. Appl. No. 13/609,271, filed Sep. 11, 2012, 6 pages.

"Response to the Requirement for Election/Restriction," Filed Date: Jun. 25, 2014, From U.S. Appl. No. 13/609,271, 7 pages.

"Non-Final Office Action," Mailed Date: Jul. 10, 2014, From U.S. Appl. No. 13/609,271, 11 pages.

"Response to the Jul. 10, 2014 Non-Final Office Action," Filed Date: Nov. 10, 2014, From U.S. Appl. No. 13/609,271, 14 pages.

"Non-Final Office Action," Mailed Date: Jun. 9, 2014, From U.S. Appl. No. 13/773,660, filed Feb. 22, 2013, 12 pages.

"Response to the Jun. 9, 2014 Non-Final Office Action," Filed Date: Oct. 30, 2014, From U.S. Appl. No. 13/773,660, 10 pages.

"Non-Final Office Action," Mailed Date: Aug. 15, 2014, From U.S. Appl. No. 13/828,622, filed Mar. 14, 2013, 14 pages.

"Final Office Action," Mailed Date: Nov. 25, 2014, From U.S. Appl. No. 13/609,271, 5 pages.

"Final Office Action," Mailed Date: Dec. 9, 2014, From U.S. Appl. No. 13,525,370, 15 pages.

"Response to Non-Final Office Action," Filed Date: Oct. 27, 2014, From U.S. Appl. No. 13,525,370, 12 pages.

"Non-Final Office Action," Mailed Date: Jun. 27, 2014, From U.S. Appl. No. 13,525,370, 13 pages.

"Response to Non-Final Office Action," Filed Date:Dec. 15, 2014, From U.S. Appl. No. 13/828622, 12 pages.

U.S. Appl. No. 13/564727, filed Aug. 2, 2012 by Hassan, et al., 20 pages.

U.S. Appl. No. 13/523,370, filed Jun. 14, 2012 by Hassan, et al., 12 pages.

U.S. Appl. No. 13/609,271 filed Sep. 11, 2012 by Hassan, et al., 18 pages.

U.S. Appl. No. 13/773,660 filed Feb. 22, 2013 by Hassan, et al., 16 pages.

U.S. Appl. No. 13/828,622 filed Mar. 14, 2013 by Hassan, et al., 23 pages.

Marcus, et al., "Regulatory and Policy Issues—Unlicensed Cognitive Sharing of TV Spectrum: The Controversy at the Federal Communications Commission," In IEEE Communications Magazine, vol. 43 Issue 5, May 2005, pp. 24-25.

International Search Report & Written Opinion Mailed Date: Sep. 8, 2014, from PCT Patent Application No. PCT/US2014/016747, 15 pages.

International Search Report & Written Opinion Mailed Oct. 6, 2014, From PCT Patent Application No. PCT/US2014/020949,15 pages.

Saeed, et al., "TVBDs Coexistence by Leverage Sensing and Geo-location Database," Retrieved at <<http://ieeexplore.ieee.org/stamp/stamp.jsp?tp=&arnumber=6271147>>, International Conference on Computer and Communication Engineering, Jul. 3, 2012, pp. 7.

Austin, Mark, "Ofcom Consultation: Digital Dividend—Cognitive Access," In OFCOM, vol. 802 Issue No. 18, Feb. 16, 2009, 63 Pages.

"PCT Demand for International Preliminary Examination," Mailed Date: Dec. 22, 2014, From US PCT Application No. PCT/US2014/016747,14 pages.

"International Search Report & Written Opinion for PCT Application No. PCT/US2014/020949", Mailed Date: Jun. 6, 2014, filed Mar. 6, 2014, 11 Pages.

Sato, et al., "TV White Spaces as part of the future Spectrum Landscape for Wireless Communications", Retrieved at <<http://docbox.etsi.org/Workshop/2012/201212_RRS/PAPERS/ABSTRACT_SATO.pdf>>, In ETSI Reconfigurable Radio Systems Workshop, Dec. 12, 2012, pp. 7.

"Dynamic Spectrum Management", Retrieved at <<http://www.interdigital.com/wp-content/uploads/2012/10/InterDigital-DSM-White-Paper_Oct2012.pdf>>, In White Paper Inter Digital, Inc, Oct. 2012, pp. 14.

Achtzehn, et al., "Deployment of a Cellular Network in the TVWS: A Case Study in a Challenging Environment", Retrieved at <<aachen.de/fileadmin/templates/images/PublicationPdfs/2011/CoRoNet2011-Cellular-in-TV-White-Spaces.pdf>>, In 3rd ACM workshop on Cognitive radio networks, Sep. 19, 2011, pp. 6.

Kerttula, et al., "Dimensioning of secondary cellular system in TVWS", Retrieved at <<http://ieeexplore.ieee.org/stamp/stamp.jsp?tp=&arnumber=6333738>>, In 7th International ICST Conference on Cognitive Radio Oriented Wireless Networks and Communications, Jun. 18, 2012, pp. 6.

U.S. Appl. No. 13/564,727, filed Jun. 18, 2012, Amer A. Hassan.

"International Preliminary Report on Patentability," from PCT Patent Application No. PCT/US2014/020949, Mailed Date: Feb. 10, 2015, 7 pages.

"PCT Demand and Response to International Search Report & Written Opinion," Filed Oct. 6, 2014, 15 pages.

"Written Opinion of the International Preliminary Examining Authority," from PCT Patent Application No. PCT/US2014/016747, Mailed Date: Mar. 3, 2015, 8 pages.

"Written Opinion of the International Preliminary Examining Authority," from PCT Patent Application No. PCT/US2014/020951, Mailed Date: Feb. 16, 2015, 5 pages.

Seok, Yongho, (LG Electronics), "CC4 Comment-Resolution-Reduced Neighbor Report; 11-13-0024-02-00af-cc4-comment-resolution-reduced-neighbor report," IEEE SA Mentor; 11-13-0024-02-00AF-CC4-Comment-Resolution-Report, IEEE-SA Mentor, Piscataway, NJ, USA, vol. 802.11af, No. 2, Jan. 14, 2013, pp. 1-5, XP068040396, [retrieved on Jan. 14, 2013].

"Non-Final Office Action," from U.S. Appl. No. 13/564,727, Mailed Jan. 6, 2015, 22 pages.

"Final Office Action," from U.S. Appl. No. 13/773,660, Mailed Jan. 27, 2015, 15 pages.

"Final Office Action", U.S. Appl. No. 13/828,622, Mailed Mar. 24, 2015, 18 pages.

Response filed Apr. 7, 2015 to Final Office Action mailed Dec. 9, 2014 from U.S. Appl. No. 13/525,370, 15 pages.

Notice of Allowance mailed May 4, 2015 from U.S. Appl. No. 13/525,370, 8 pages.

Notice of Allowance mailed Jun. 1, 2015 from U.S. Appl. No. 13/525,370, 4 pages.

(56) References Cited

OTHER PUBLICATIONS

Applicant Initiated Interview Summary mailed Jun. 1, 2015 from U.S. Appl. No. 13/525,370, 2 pages.
Response filed Feb. 23, 2015 to Final Office Action mailed Nov. 25, 2014 from U.S. Appl. No. 13/609,271, 9 pages.
Notice of Allowance mailed Mar. 24, 2015 from U.S. Appl. No. 13/609,271, 8 pages.
Preliminary Amendment filed Jun. 26, 2015 from U.S. Appl. No. 14/738,562, 8 pages.
Response filed Apr. 28, 2015 to Final Office Action mailed Jan. 27, 2015 from U.S. Appl. No. 13/773,660, 11 pages.
International Preliminary Report on Patentability mailed May 29, 2015 from PCT Patent Application No. PCT/US2014/016747, 11 pages.
Final Office Action mailed Jun. 19, 2015 from U.S. Appl. No. 13/564,727, 28 pages.
Response filed Jun. 4, 2015 to Non-final Office Action mailed Jan. 6, 2015 from U.S. Appl. No. 13/564,727, 10 pages.
First Office Action and Search Report mailed Jun. 23, 2015 from China Patent Application No. 201310241494.8, 13 pages.
Demand under Article 34 filed Sep. 17, 2014, from PCT Patent Application No. PCT/US2014/020951,16 pages.
International Preliminary Report on Patentability mailed Jun. 4, 2015 from PCT Patent Application No. PCT/US2014/020951, 10 pages.
Response filed Jun. 9, 2015 to Final Office Action mailed Mar. 24, 2015 from U.S. Appl. No. 13/828,622, 9 pages.
Hassan, et al., "White Space Utilization," U.S. Appl. No. 14/738,562, 53 pages.
Voluntary Amendment filed Feb. 15, 2016 from China Patent Application No. 201480010128.4, 10 pages.
Non-Final Office Action mailed Feb. 5, 2016 from U.S. Appl. No. 14/951,426, 19 pages.
Response filed Jan. 14, 2016 to Non-Final Office Action mailed Nov. 3, 2015 from U.S. Appl. No. 13/564,727, 11 pages.
Notice of Allowance mailed Dec. 30, 2015 from U.S. Appl. No. 13/525,370, 10 pages.
Notice of Allowance mailed Jan. 4, 2016 from U.S. Appl. No. 13/773,660, 20 pages.
Preliminary Amendment filed Dec. 22, 2015 from U.S. Appl. No. 14/951,426, 7 pages.
Voluntary Amendment filed Mar. 16, 2016 from China Patent Application No. 201480015162.0, 7 pages.
Voluntary Amendment filed Mar. 16, 2016 from China Patent Application No. 201480015444.0, 6 pages.
Intention to Grant mailed Feb. 15, 2016 from European Patent Application No. 14715154.2, 47 pages.
International Preliminary Report mailed Mar. 17, 2015 from PCT Patent Application No. PCT/US2013/058348, 8 pages.
Non-Final Office Action mailed Aug. 13, 2015 from U.S. Appl. No. 13/828,622, 24 pages.
Final Office Action mailed Mar. 11, 2016 from U.S. Appl. No. 13/564,727, 53 pages.
Final Office Action mailed Mar. 11, 2016 from U.S. Appl. No. 13/828,622, 43 pages.
Second Office Action mailed Feb. 14, 2016 from China Patent Application No. 201310241494.8, 10 pages.
Notice of Allowance mailed Sep. 18, 2015 from U.S. Appl. No. 13/525,370, 6 pages.
International Search Report mailed Nov. 18, 2013 from PCT Patent Application No. PCT/US2013/058348, 12 pages.
Applicant Initiated Interview Summary mailed Sep. 17, 2015 from U.S. Appl. No. 13/564,727, 3 pages.
Response filed Sep. 22, 2015 to Final Office Action mailed Jun. 19, 2015 from U.S. Appl. No. 13/564,727, 11 pages.
International Preliminary Report mailed Dec. 23, 2014 from PCT Patent Application No. PCT/US2013/045284, 9 pages.
Response filed Sep. 24, 2015 to First Office Action mailed Jun. 23, 2015 from China Patent Application No. 201310241494.8, 9 pages.

Notice of Allowance mailed Aug. 28, 2015 from U.S. Appl. No. 13/773,660, 9 pages.
Supplemental Notice of Allowability mailed Sep. 25, 2015 from U.S. Appl. No. 13/773,660, 2 pages.
Non-Final Office Action mailed Nov. 3, 2015 from U.S. Appl. No. 13/564,727, 25 pages.
Applicant-Initiated Interview Summary mailed Nov. 30, 2015 from U.S. Appl. No. 13/828,622, 3 pages.
Response filed Dec. 9, 2015 to the Non-Final Office Action mailed Aug. 13, 2015 from U.S. Appl. No. 13/828,622, 12 pages.
Response filed May 3, 2016 to Final Office Action mailed Mar. 11, 2016 from U.S. Appl. No. 13/564,727, 12 pages.
Response filed Apr. 25, 2016 to Second Office Action mailed Feb. 14, 2016 from China Patent Application No. 201310241494.8, 10 pages.
Response filed Apr. 29, 2016 to Non-Final Office Action mailed Feb. 5, 2016 from U.S. Appl. No. 14/951,426, 13 pages.
Non-Final Office Action mailed Jun. 10, 2016 from U.S. Appl. No. 13/564,727, 41 pages.
Restriction Requirement mailed Jun. 24, 2016 from U.S. Appl. No. 14/738,562, 6 pages.
Final Office Action mailed Jul. 26, 2016 from U.S. Appl. No. 14/951,426, 14 pages.
Response filed Aug. 10, 2016 to the Restriction Requirement mailed Jun. 24, 2016 from U.S. Appl. No. 14/738,562, 7 pages.
Non-Final Office Action mailed Aug. 17, 2016 from U.S. Appl. No. 14/738,562, 75 pages.
Response filed Aug. 31, 2016 to th Final Office Action mailed Jul. 26, 2016 from U.S. Appl. No. 14/951,426, 9 pages.
Response filed Aug. 30, 2016 to the Non-Final Office Action mailed Jun. 10, 2016 from U.S. Appl. No. 13/564,727, 15 pages.
Response filed Sep. 2, 2016 to the Final Office Action mailed Mar. 11, 2016 from U.S. Appl. No. 13/828,622, 16 pages.
Notice of Allowance mailed Sep. 9, 2016 from U.S. Appl. No. 13/564,727, 27 pages.
Response filed Oct. 24, 2016 to the Third Office Action mailed Aug. 29, 2016 from Chinese Patent Application No. 2013102414948, 10 pages.
Terminal Disclaimer and Response filed Oct. 25, 2016 to the Non-Final Office Action mailed Aug. 17, 2016 from U.S. Appl. No. 14/738,562, 11 pages.
Notice of Allowability mailed Oct. 14, 2016 from U.S. Appl. No. 13/564,727, 10 pages.
Notice of Allowability mailed Nov. 9, 2016 from U.S. Appl. No. 13/564,727, 8 pages.
Non-Final Office Action mailed Nov. 10, 2016 from U.S. Appl. No. 14/951,426, 26 pages.
Notice of Allowability mailed Nov. 22, 2016 from U.S. Appl. No. 13/564,727, 6 pages.
Non-Final Office Action mailed Nov. 30, 2016 from U.S. Appl. No. 13/828,622, 62 pages.
Applicant-Initiated Interview Summary mailed Mar. 3, 2017 from U.S. Appl. No. 13/828,622, 3 pages.
Response filed Dec. 19, 2016 to the Non-Final Office Action mailed Nov. 10, 2016 from U.S. Appl. No. 14/951,426, 9 pages.
Notice of Allowance mailed Dec. 22, 2016 from U.S. Appl. No. 14/738,562, 33 pages.
Notice of Allowance mailed Feb. 21, 2017 from U.S. Appl. No. 14/738,562, 14 pages.
Response filed Feb. 28, 2017 to the Non-Final Office Action mailed Nov. 30, 2016 from U.S. Appl. No. 13/828,622, 15 pages.
Applicant-Initiated Interview Summary mailed Mar. 29, 2017 from U.S. Appl. No. 13/828,622, 3 pages.
Notice of Allowance mailed Jan. 27, 2017 from U.S. Appl. No. 14/951,426, 20 pages.
Notification on Grant of Patent Right mailed Jan. 3, 2017 from Chinese Patent Application No. 201310241494.8, 5 pages.
Final Office Action dated Jun. 14, 2017 from U.S. Appl. No. 13/828,622, 55 pages.

* cited by examiner

RADIO SPECTRUM UTILIZATION

BACKGROUND

Ever increasing numbers of wireless devices are being introduced and sold. As such, the radio channel (RF) spectrum available for these wireless devices to communicate continues to get more and more crowded. More efficient use of the RF spectrum and sharing under-utilized RF spectrum are very important to meet the growing number of wireless devices. One portion of the RF spectrum that is under-utilized is the portion reserved for broadcasting, such as television (TV) broadcasting. Governmental regulators divided the TV portion or range (and/or other portions) into a plurality of channels. However, for any given geographic region many of the channels are not utilized for TV or radio broadcasting.

Unused frequencies or channels of the reserved TV portion of the RF spectrum can be referred to as TV white space. It is possible to utilize these TV white spaces for other uses, however, their use tends to be tightly regulated by governmental institutions (such as the Federal Communications Commission in the United States).

These governmental institutions are establishing databases that map channels or channel utilization to geographic location. Stated another way, for a given location, the database can indicate a sub-set of channels that are utilized (e.g., allocated) for TV broadcasting and other licensed use (such as wireless microphones in some countries) and/or a different sub-set of channels that are TV white spaces.

Wireless devices that would like to communicate data over a radio white space channel, such as a TV white space channel, have to do so in compliance with the rules established by the governmental institutions. For instance, the devices cannot transmit on allocated channels, since the transmission could interfere with the licensed use.

SUMMARY

The described implementations relate to radio channel utilization. The channels can include any channels in the radio spectrum that can be utilized to accomplish communication between devices. The channels can include radio white space channels. As used herein, the term "radio white space" can include TV white space and/or any other radio white space.

One example implementation can monitor a location of a mobile device that has cellular capabilities. The example can identify a set of channels that are available to the mobile device at the location. The example can also send the set of channels to the mobile device with a suggestion for the mobile device to utilize one or more of the channels of the set to accomplish data communication rather than using the cellular capabilities.

Another example can obtain a set of channels that are available at a location of a device. The example can send the set of available channels to the device. The example can also receive information that the device established a network on an individual channel from the set of available channels. The example can further cause the information about the individual channel to be associated with the location.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio spectrum, and more specifically to more efficient use of radio channels of the spectrum. More efficient use of radio channels can allow the radio spectrum to support more traffic overall and/or at a specific location. More efficient radio spectrum use can be achieved by tracking radio channels available for use at a given location along with the use of individual channels. This information can allow traffic from congested channels to be switched to less congested channels.

Radio channels can include radio white space channels, cellular channels, Wi-Fi channels, Bluetooth channels, etc. Radio white space channels can include TV white space channels and/or other radio white space channels. As used herein a "TV white space channel" means a channel or channel range that was reserved for TV broadcasting, but which is not actually used for TV broadcasting in a particular geographic region. Similarly, "radio white space channel" means a channel or channel range that was reserved for TV broadcasting, for other radio broadcasting, or two way radio communications, but which is not actually used in such manner in a particular geographic region. Stated another way, radio white space can refer to allocated but unused radio spectrum.

System Examples

Figure 1:
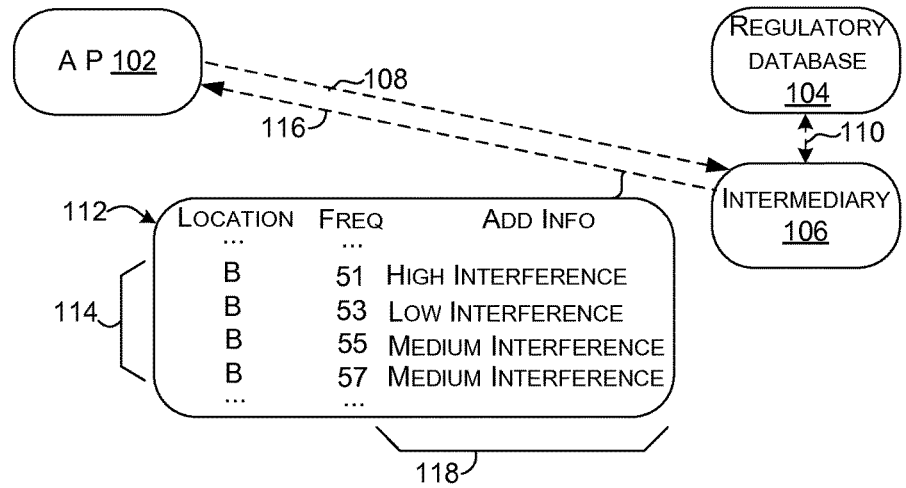
FIGS. 1-8 show examples of systems configured to utilize radio channels in accordance with some implementations of the present concepts.
Figure 1:
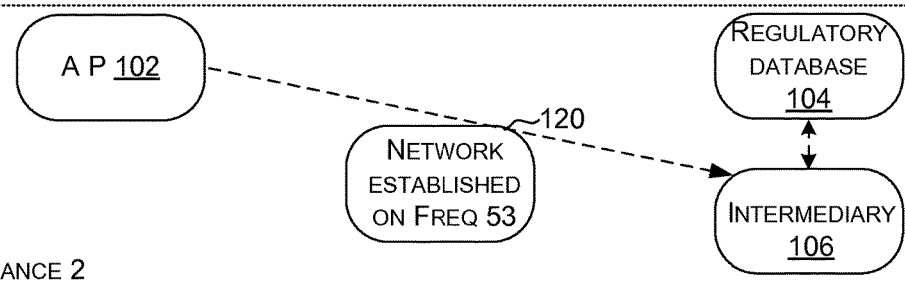
Figure 1:
Figure 1:
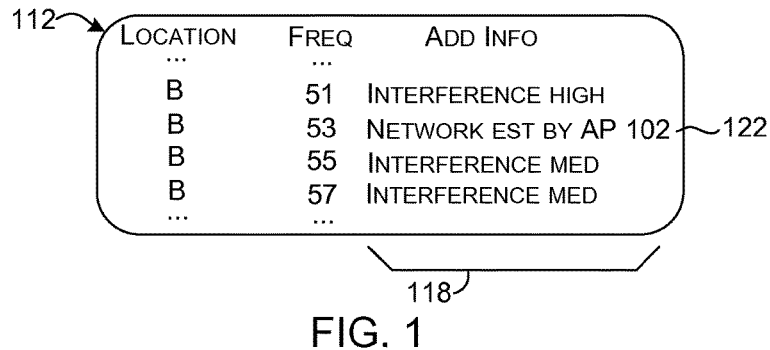

For purposes of explanation consider introductory FIG. 1, which shows a scenario involving a system 100 where utilization of radio white space channels can be accomplished. System 100 can include a wireless access point (AP) 102, a regulatory database 104 and intermediary 106. Assume for purposes of explanation that the AP is at hypothetical location "B". Assume further that the AP wants to establish a wireless network and as such wants to know what channels (e.g., channels are available). Note that while specific examples of APs are utilized for purposes of explanation, from one perspective an AP can be any kind of device that can establish a wireless network on a relatively temporary basis (e.g., smart phone) or a relatively long term basis (e.g., router).

At instance 1, the AP 102 could query the regulatory database 104 with its location information. The regulatory database could return a set of location-based available radio white space channels and associated constraints to the AP. Alternatively or additionally, in the illustrated configuration, the AP can contact the intermediary 106 as indicated at 108. The AP 102 can provide its location to the intermediary 106. (In a third contemplated scenario, the AP could contact both the regulatory database and the intermediary.)

In this implementation, the intermediary 106 can be in communication with the regulatory database 104 as indicated at 110. The intermediary can maintain a dynamic database of channels (hereinafter, "dynamic database") 112 with location specific information from the regulatory database. As indicated at 114, the intermediary can return the set of location-based available radio white space channels 114 to the AP at 116. Further, the intermediary can return additional information 118 about the set of location-based available radio white space channels 114. For instance, in this case, for location B, hypothetical channels 51, 53, 55, and 57 are available. Further, the additional information 118 (on a per row basis) indicates that channel 51 is experiencing "High Interference", channel 53 is experiencing "low Interference", channel 55 is experiencing "medium Interference", and channel 57 is experiencing "medium Interference". (This is just one example of additional information. Additional examples are described below).

At Instance 2, the AP 102 can use the additional information 118 to decide which individual channel (or multiple channels) to establish a network on. In this case, channel 53 has the least interference. As such, assume that the AP establishes a wireless network on channel 53 and communicates this information back to the intermediary 106 as indicated at 120.

Instance 3 shows the channel information (e.g., feedback) provided by the AP 102 reflected in the dynamic database 112. Specifically, the information is evident at row 122. The additional information 118 relating to channel 53 recites "Network established by AP 102". While in the illustrated example the additional information is relatively brief for purposes of explanation, the additional information can include other details, such as time the network was established, duration of the network, allowed power, etc. The additional information 118 of the dynamic database 112 can be useful for other devices that are attempting to establish a network at location B or utilize a network at location B. One such example is described below relative to FIG. 2.

Figure 2:
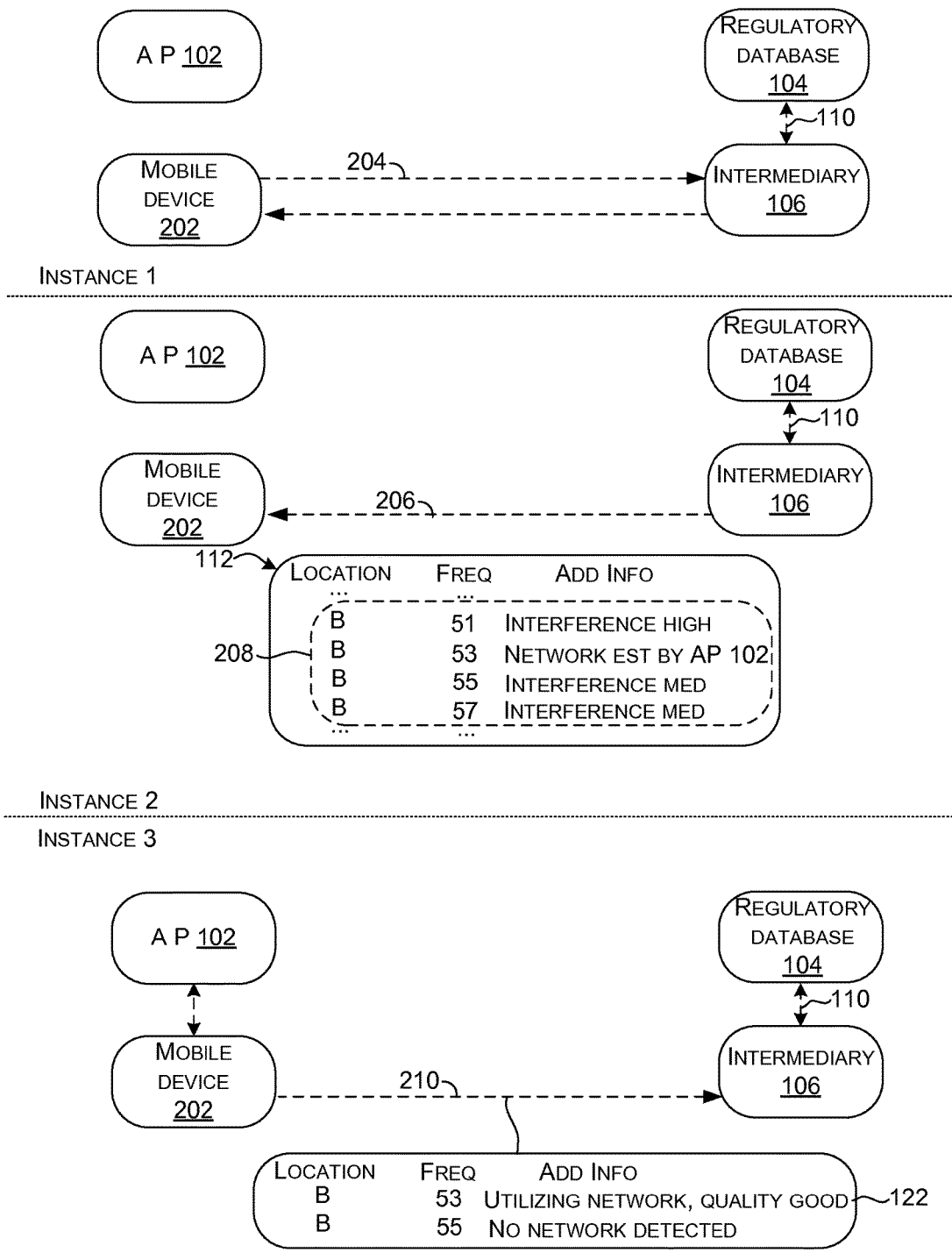

FIG. 2 retains the elements introduced above relative to FIG. 1. FIG. 2 also introduces a new element in the form of a mobile device 202. For purposes of explanation, assume that mobile device 202 is proximate to hypothetical location B (e.g., close to AP 102). In one case, the two devices can be within one hundred meters of one another, but the distance is not critical to the present concepts. Assume further that mobile device 202 wants to communicate data over a channel, such as (but not limited to) a radio white space channel. Stated another way, the mobile device wants to find a network on an individual available channel over which it can communicate the data. In one such example, the mobile device could be a smart phone that wants to utilize a non-cellular radio channel to download/upload video. Of course, this example is provided for purposes of explanation and is not intended to be limiting.

Toward this end, at Instance 1, the mobile device 202 can send its location to intermediary 106 as indicated at 204. For example, in the case of the smart phone, the smart phone can utilize its cellular capabilities to contact the intermediary. As mentioned above relative to FIG. 1, in this configuration, intermediary 106 can communicate with regulatory database 104. The regulatory database 104 can maintain a location-specific database of radio white space channels. Intermediary 106 can populate its own dynamic database 112 with information from the regulatory database along with additional information. The additional information can relate to radio white space channels provided by the regulatory database and/or to other channels that are monitored by the intermediary but not the regulatory database.

At Instance 2, in this case, as indicated at 206, the intermediary 106 sends content 208 relating to location B from the dynamic database 112 to mobile device 202. In this example, the content is manifest as a set of channels that are available at the location and additional information about the channels.

At Instance 3, the mobile device 202 can utilize the content 208 from the intermediary 106 to identify a network for data communication. Toward this end, the mobile device can evaluate the content to determine what actions to take. For instance, the mobile device 202 could decide to start with channel 53 based upon the associated additional information that a "Network established by AP 102" is present on that channel. For example, the mobile device could ping AP 102 on channel 53 (probe request). The AP could reply with a probe response. Once authentication is completed, the mobile device can communicate data over the network. This process could be faster and/or less resource intensive than scanning each of the available channels for a network. However, in some cases, the query may return only channels and not network information for the location. In such a case, the mobile device 202 can perform active and/or passive scanning on the returned available channels to identify a network. Further, even in instances where the returned content indicates channels with networks, the mobile device may scan some or all of the returned available channels to find additional networks and/or to find additional information about its environment.

At Instance 3, the mobile device 202 can communicate information back to the intermediary 106 as indicated at 210. Stated another way, the mobile device can investigate its environment and send the results to the intermediary. In this case, the information relative to channel 53 indicates that the mobile device is "utilizing the network, quality good" as indicated on row 122. Relative to channel 55 the information indicates "No network detected". The intermediary 106 can utilize this information to update dynamic database 112. Thus, even more information is available for subsequent location-based queries and/or for other uses.

Figure 3:
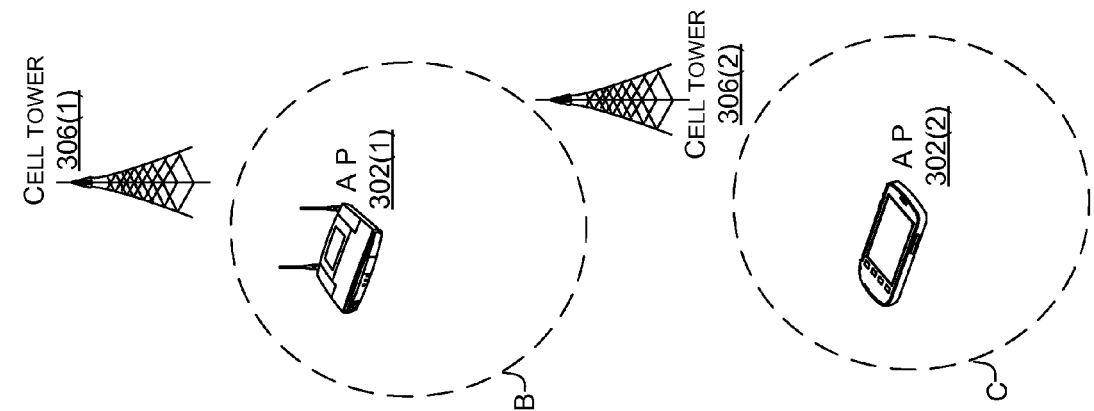
Figure 3:
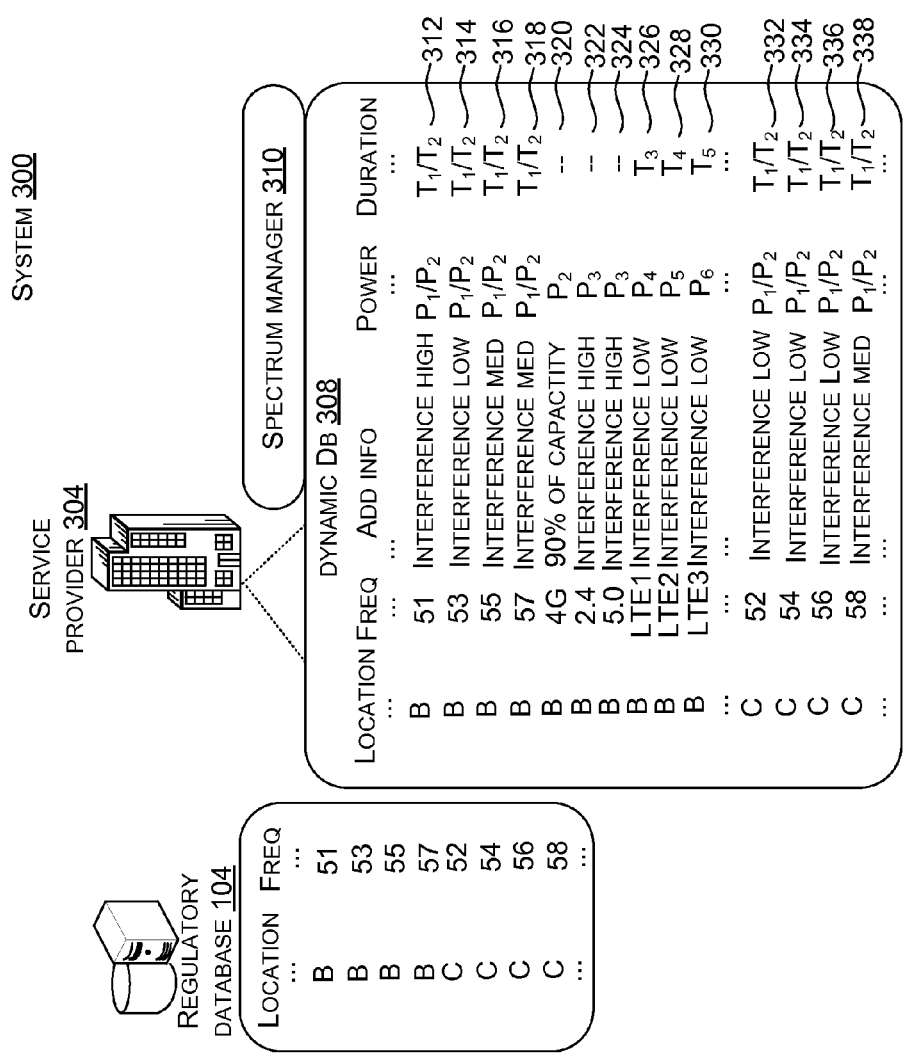
Figure 4:
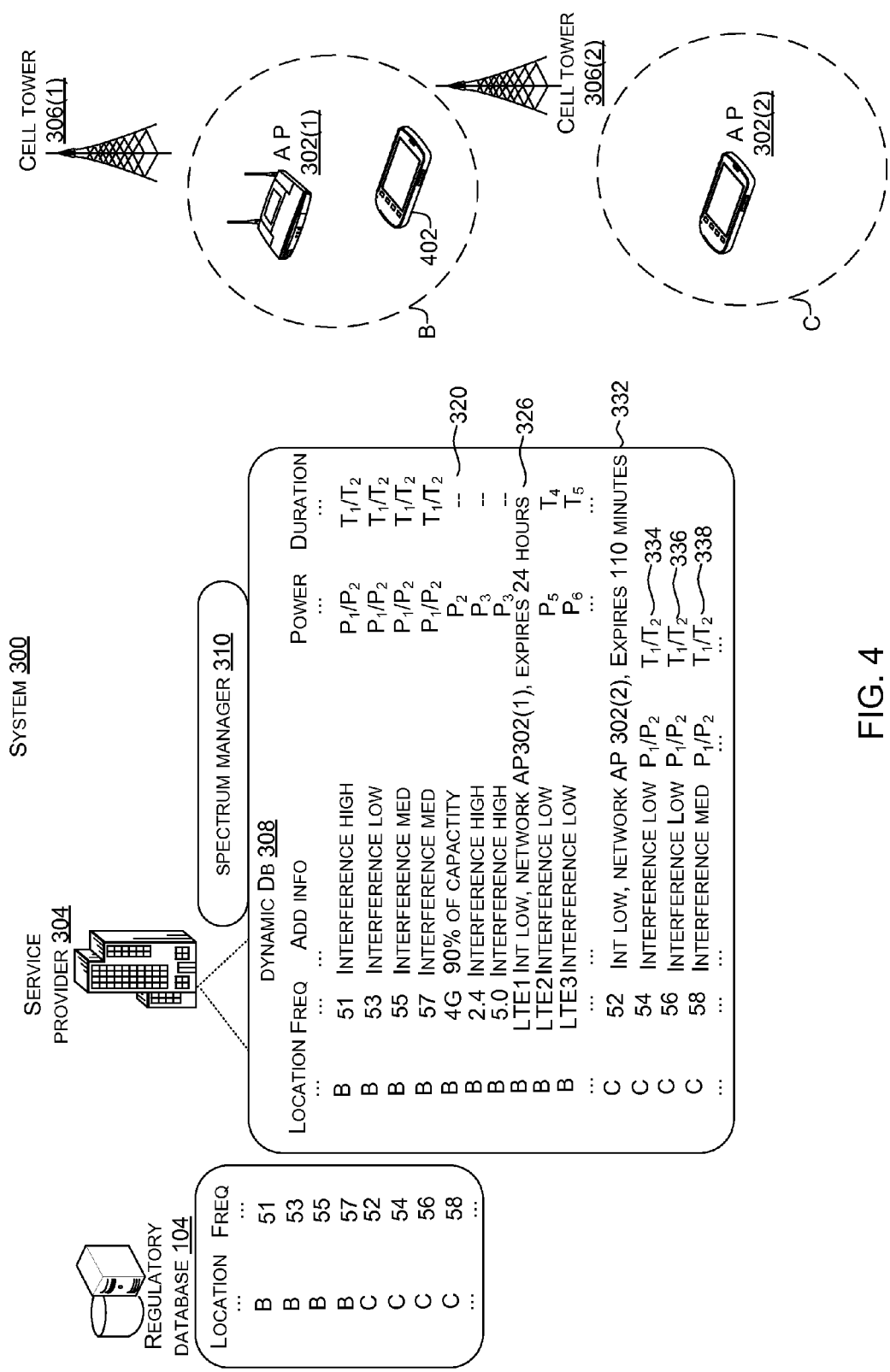
Figure 5:
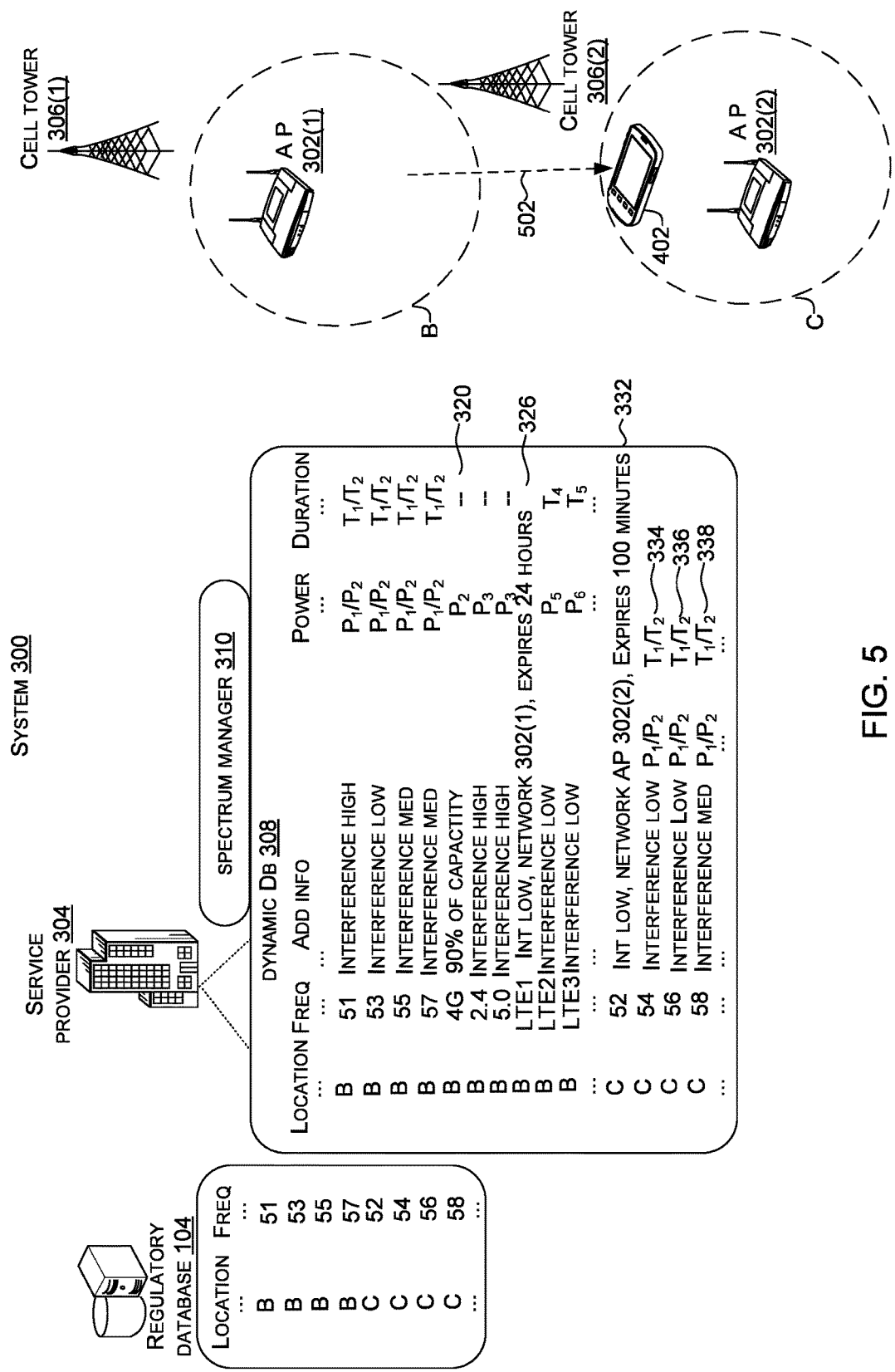

FIGS. 3-5 collectively expand upon some of the concepts introduced above relative to FIGS. 1-2 and/or introduce additional concepts. FIG. 3 relates to a system 300 that retains the regulatory database 104 introduced in FIG. 1. System 300 also includes two APs 302(1) and 302(2). In this example, the intermediary discussed above is manifest as a service provider 304, such as a cellular service provider. The cellular service provider controls two cell towers 306(1) and 306(2) and the APs 302(1) and 302(2). The cellular service provider maintains dynamic database 308 which is similar to the dynamic database introduced above relative to FIGS. 1-2.

In this configuration, the service provider 304 further includes a spectrum manager 310. The spectrum manager can be configured to synchronize the dynamic database 308 with the regulatory database 104 for those locations of interest to the service provider. For instance, the spectrum manager 310 can synchronize the dynamic database 308 with the regulatory database for those locations (e.g. including locations B and C) for which the service provider provides cell service.

The spectrum manager 310 and/or the APs 302(1) and 302(2) can utilize the information in the dynamic database 308 to manage the APs 302(1) and 302(2). For instance, assume that each AP wants to establish a network at its respective location. The APs can query the spectrum manager 310 with their location. The spectrum manager can reference the location in the dynamic database.

Assume that AP 302(1) wants to establish a network at location B. The spectrum manager 310 has obtained information and populated the information into dynamic database 308. This information relates to both radio white space channels (e.g., rows 312-318 and 332-338) and other channels (e.g., rows 320-330). For instance, rows 312, 314, 316, and 318 relate to radio white space channels 51, 53, 55, and, 57, respectively. Row 320 relates to a 4G cellular network channel. Rows 322 and 324 relate to Wi-Fi-channels. Rows 326, 328, and 330 relate to 4G LTE channels. Of course, while relatively few channels can be illustrated for sake of brevity, the dynamic database 308 can include any radio channels that could be used for communicating data.

Each of these rows 312-338 of the dynamic database 308 lists additional information. In this illustrated example, some of the additional information is in the form of detected interference levels, constraints, such as power levels of use (as prescribed by the regulatory database 104) and duration of use (as prescribed by the regulatory database 104). Of course, any type of information that can be useful for managing channel usage can be stored in the dynamic database 308.

In this implementation, relative to an individual radio white space channel, the regulatory database 104 may allow multiple combinations of constraints. While not shown relative to the regulatory database 104 due to space limitations, several such examples are illustrated relative to the dynamic database 308. For instance, looking at row 312, radio white space channel 51 can be used at a first power level $P_1$ for a first duration or time $T_1$ or a second power level $P_2$ for a second duration $T_2$. For instance, power $P_1$ may be a relative higher power than power $P_2$. For example, power $P_1$ may be 0.1 Watts and power $P_2$ might be 0.01 Watts. Correspondingly, duration $T_1$ may be less than duration $T_2$ (e.g., more power for less time or lower power for more time). For example, duration $T_2$ could be 2 hours and duration $t_3$ could be 24 hours. Thus, an individual radio white space channel can be used at a lower power for a longer duration or a higher power for a shorter duration. Further, in this example, specific alternative constraints or conditions of use are provided.

In one implementation, when the AP 302(1) queries the spectrum manager 310, the spectrum manager can return a set of channels/channels $(f_1, t_1), (f_2, t_2), \ldots (f_n, t_n)$. In return for being able to select from these options, the AP has to query the spectrum manager for channel $f_1$ in period or duration $t_1$.

In another case, the spectrum manager 310 can return $(f_1, f_2, \ldots, f_n)(T)$. In this case, the AP 302(1) agrees to use the channels assigned and agrees to query the spectrum manager in duration T. If T is null, the device queries the DB in a default time period (24 hours in the US).

Another implementation can tie the channel of specified AP queries to power levels on the utilized channel. For example, the AP 302(1) can query spectrum manager 310 for radio white space channels. Stated another way, the spectrum manager can return a set of channels $(f_1, p_1, t_1), (f_1, p_2, t_2)$. As a condition of using the channel(s) the AP has to query the spectrum manager 310 for channel $f_1$ in period $t_1$ when using power level $p_1$ and period $t_2$ when using power $p_2$. Thus, the higher the power level of use the more frequent the AP has to check in with the spectrum manager.

In another configuration, the spectrum manager 310 may give permission for the querying AP 302(1) to use an individual channel for an extended period (for example, 100 days rather than the default one day). In exchange for the extended use, the AP has to agree to be reachable at specific (or all) times. For instance, the extended conditional use may require the AP to be reachable at all times within 10 minutes, for example. This configuration can allow the spectrum manager to offer extended use of individual channels, but retain the right to rescind the use in the event that conditions change. For instance, in one scenario, the channel could be a channel that is allocated but unused. The spectrum manager could give permission for the AP to use the channel for six months. However, if the spectrum manager is informed that the licensed use is going to commence, the spectrum manager can contact the AP and indicate that the conditional use expires at a specific new time, such as 24 hours. These aspects are discussed in more detail below.

In some implementations, the AP may be able to negotiate the conditions of use rather than selecting from predefined alternatives. For instance, the regulatory database 104 may associate the radio white space channel with default constraints. The AP may negotiate the conditions with either the dynamic database 308 or the regulatory database 104 to identify conditions that are agreeable to both. This aspect is discussed in more detail below.

Returning to the illustrated dynamic database 308, row 320 shows that 4G bandwidth use at location B is presently at 90% of capacity. Rows 322 and 324 show that 2.4 and 5.0 Gigahertz channels (e.g., Wi-Fi) are experiencing high levels of interference. Rows 326, 328, and 330 relate to channels LTE1, LTE2, and LTE3, respectively. (Assume for purposes of explanation that this channel is licensed to the service provider, but is not being used for the intended licensed use).

Row 328 relates to channel LTE2. In this case, duration $T_4$ can be dependent upon reachability of the device that wants to use the channel. For instance, the duration may be six months based upon the condition that the device is available (e.g., can be contacted) at all times within one hour. This can allow the use to be stopped if conditions change, such as if the licensed use starts during the duration. Of course, while specific examples are illustrated, the additional information in the dynamic database 308 can relate to any information that can be useful to allow channels to be utilized efficiently.

In this case, assume that the 4G cellular network is very crowded at locations B and C. The spectrum manager 310 can attempt to decrease use of the 4G channel (row 320) by shifting communication to other networks. Toward this end, the spectrum manager 310 can suggest or instruct the AP 302(1) to utilize LTE1 consistent with row 326. As a condition of this usage, the spectrum manager can request that the AP 302(1) report its progress and information about its environment. As such, AP 302(1) can establish a network consistent with row 326 and report conditions relating to the network, such as the amount of interference and/or the amount of use.

Now assume that AP 302(2) queries the spectrum manager 310 with its location C. The spectrum manager can supply some or all of the information (rows 332-338) relating to location C to the AP. In this case, assume that AP 302(2) establishes a network on channel 52 and reports this information back to the spectrum manager 310. Further, assume that AP 302(2) agrees to utilize channel 52 at $P_1$ for duration $T_2$ (2 hours in this example). This information will be reflected in updates to the dynamic database 308 reflected in FIG. 4 (not all of the information can be illustrated due to space constraints on the drawing page).

FIG. 4 shows the dynamic database 308 updated at rows 326 and 332 to reflect the information obtained from APs 302(1) and 302(2), respectively. Assume that ten minutes has passed since AP 302(2) started its network. As such, row 332 indicates that the network provided by AP 302(2) may cease in 110 minutes. Assume also that a mobile device 402 is now at location B and is utilizing the 4G channel of row 320 to transfer large amounts of data. This data transfer may exceed the available bandwidth on the 4G channel and/or may contribute to the mobile device incurring costs, such as may be associated with exceeding a cellular data plan. For these or other reasons, the mobile device may query the spectrum manager looking for an alternative network to utilize for the data transfer. The mobile device 402 can query the spectrum manager 310 with its location and request information about available channels and/or networks.

In an alternative scenario, the spectrum manager 310 may monitor devices within its service area and/or utilizing the service provider's resources. In this example, the spectrum manager may contact mobile device 402 and make a suggestion to the mobile device based upon information from the dynamic database 308. For example the spectrum manager may contact mobile device 402 and suggest that the mobile device attempt to utilize the network provided by AP 302(1) to accomplish the data transfer. The spectrum manager may suggest that all of the data transfer be switched from the 4G channel to the LTE1 network established by AP 302(1). In the alternative, the spectrum manager may suggest that certain types of data transfers be switched to the LTE1 network while other types of data transfers are maintained on the 4G channel. For instance, video transfer may be switched while voice (e.g., a phone call) may be maintained on the 4G channel.

FIG. 5 shows a subsequent view of system 300 where mobile device 402 has moved from location B to location C as indicated at 502. In this scenario, the dynamic database 308 and the spectrum manager 310 can assist the mobile device to maintain network connectivity. For instance, as the mobile device leaves location B, the spectrum manager can suggest to the mobile device to switch back to 4G lacking other options. Similarly, as the mobile device approaches location C, the spectrum manager can suggest that the mobile device switch to channel 52 and contact AP 302(2) to join its network. Stated another way, the spectrum manager can send information about the AP that is hosting the network to the mobile device to facilitate the mobile device joining the network. For instance, the spectrum manager can send the device identification of the AP (in this case represented by indicator 302(2)) to the mobile device. The mobile device can utilize the device identification to initiate communications with the AP.

Assume in this case, that 10 more minutes have passed between the view of FIG. 4 and the view of FIG. 5. This change is evidenced in row 332 which shows that AP 302(2)'s network may cease in 100 minutes (e.g., updated from 110 minutes in FIG. 4 and originally two hours).

Thus, the spectrum manager can make an informed suggestion to mobile device 402 that AP 302(2)'s network is likely in operation when the mobile device approaches location C. In another configuration, the spectrum manager may query AP 302(2) about the status of the network before making the suggestion to mobile device 402. In summary, the dynamic database 308 and/or the spectrum manager 310 can facilitate more efficient use of available white space channels and/or other channels.

As mentioned above, the spectrum manager 310 can utilize the information in the dynamic database 308 to enhance network continuity (e.g., the ability to successfully communicate data) for the mobile device 402. The spectrum manager can also utilize the dynamic database information to enhance AP functionality. For instance, the spectrum manager can note that AP 302(2)'s use of radio white space channel 52 expires in 100 minutes. As the expiration approaches, the spectrum manager can supply channels from the database with which the AP can establish a new network. These channels could include radio white space channel 52 as well as other channels. The point being that the spectrum manager can aid the AP in preparing for a new network prior to expiration of the existing network. Once the AP establishes a new network (on the same channel or a different channel) the AP can report that information to the spectrum manager. The spectrum manager can contact devices which might be affected by the network change (such as mobile device 402). The spectrum manager can provide information about the new network to these devices. The devices can then seamlessly transition to the new network with little or no connectivity interruption (e.g., no dropped connections).

Thus, the dynamic database 308 and the spectrum manager 310 can contribute to more efficient use of radio channel bandwidth, such as by allowing devices to negotiate for channel use that is customized to the intended use. Further, the dynamic database 308 and the spectrum manager 310 can facilitate temporary use of allocated but unused channels. Further, the dynamic database 308 and the spectrum manager 310 can provide information to mobile (e.g., client devices) that allows the client devices to utilize less crowded and/or less costly (to the client device) channels and to seamlessly transition between networks.

Note that space constraints limit the number of illustrated channels in the dynamic database 308 and the additional information associated with individual channels. In practice, the dynamic database could include any and/or all channels of the radio spectrum and greater detail and/or different types of additional information than the illustrated examples. The dynamic database can provide information about what channels are available at a location and the conditions of the channels. This information can allow data communication to be shifted from relatively congested channels to relatively less congested channels.

Figure 6:
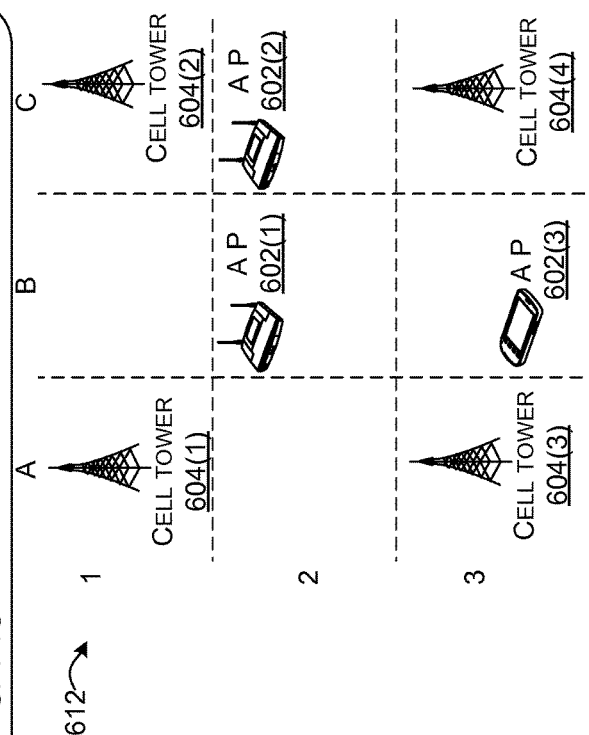

FIG. 6 shows another system 600. This system includes three APs 602(1), 602(2), and 602(3) and four cell towers 604(1), 604(2), 604(3), and 604(4). Assume for purposes of explanation that AP 602(1) and cell towers 604(1) and 604(3) are associated with a first service provider (e.g., SP1) and AP 602(2) and cell towers 604(2) and 604(4) are associated with a second service provider (e.g., SP2). AP 602(3) is not associated with either service provider. System 600 further includes dynamic database 608 and spectrum manager 610. Dynamic database 608 and/or spectrum manager 610 can be associated with one of the service providers, a regulatory body, and/or a third party.

In this example, the dynamic database 608 maintains a grid of locations 612. In this case, the grid of locations is demarcated on the horizontal axis with letters (e.g., "A", "B", and "C", etc.) and on the vertical axis with numerals (e.g., "1", "2", and "3", etc.). The grid of locations can relate locations with services available at individual locations, devices at individual locations, channels at individual locations (cellular and non-cellular channels), conditions at individual locations, and/or other information. Of course, other types of mappings between geographic locations and services available at individual locations, devices at individual locations, conditions at individual locations, and/or other information can be utilized.

Looking now to the first horizontal line of the dynamic database 608 indicates that the location A1 has listed available channels (e.g., channels that can be utilized) as 51, 53, and 55 (radio white space), as well as 2.4 (Wi-Fi), and 4G. Of course, the space limitations of the drawing page do not lend themselves to a full listing. As such, the illustrated listing of channels is intended to be representative for purposes of explanation. This line also indicates under the device heading that service provider (SP1) has cell tower 604(1) at this location. In this example, a single network in the form of a 4G cell network provided by SP1 is available at this location. No other information is listed for this location.

Note that the location size (e.g., each unit of the grid) can be any selected size that is useful for managing the devices and/or services of the grid. For instance, in the US, the television white spaces regulatory database requires device locations to be known within 100 meters. As such, the units of the grid could represent 100 meters. (For ease of explanation in the illustrated example, assume that each cell tower provides coverage in its occupied grid unit and each adjacent grid unit. For example, cell tower 604(1) can provide cell coverage to grid units A1, B1, A2, and B2. Similarly, cell tower 604(2) can provide coverage to B1, C1, B2, and C2. Of course, the scale of the cell coverage may be different in other scenarios, but this ratio serves the purposes of explanation).

Line B1 shows the channels and networks available at this location. In this case, cell networks are available from both service provider 1 (SP1) and service provider 2 (SP2).

Skipping ahead to location B2, the dynamic database 608 indicates that AP 602(1) is at this location. The available networks include SP1 and SP2 4G networks as well as 2.4 Gigahertz Wi-Fi and channel 51 radio white space provided by AP 602(1). Further, the other information section indicates high ("↑") interference on the 2.4 Gigahertz network. Additionally, the network provided by AP 602(1) on radio white space channel 51 expires in 12 hours.

Looking now at location C2, the dynamic database 608 indicates that AP 602(2) is at this location. The available networks include SP1 and SP2 4G networks as well as 2.4 Gigahertz Wi-Fi and channel 55 radio white space provided by AP 602(2). Further, the other information section indicates high ("↑") interference on the 2.4 Gigahertz network. Additionally, the network provided by AP 602(2) on radio white space channel 55 expires in 3 hours.

Skipping ahead to location B3, the dynamic database 608 indicates that AP 602(3) is at this location. The available networks include SP1 and SP2 4G networks as well as 2.4 Gigahertz Wi-Fi provided by AP 602(3). Further, the other information section indicates high ("↑") interference on the 2.4 Gigahertz network.

At this point, assume that AP 602(3) wants to provide another network. For instance, the AP may want to provide another network based upon the high interference on its 2.4 Gigahertz network. Toward this end, the AP 602(3) can use the dynamic database 608 as a resource to determine which channel to utilize for the new network. In this case, three radio white space channels 51, 53, and 55 are available. However, the dynamic database indicates that radio white space channels 51 and 55 are being utilized at adjacent locations (e.g., B2 and C2). As such, AP 602(3) can rank radio white space channel 53 as the channel to try first.

In an alternative configuration, the spectrum manager 610 may monitor the dynamic database 608 and notice the high interference levels on the 2.4 Gigahertz channel as reported by APs 602(1), 602(2), and 602(3). Based upon this information, the spectrum manager may identify other channels that could be utilized by AP 602(3). The spectrum manager 610 could contact AP 602(3) and suggest that the AP provide a new network on one of the other channels, such as radio white space channel 53. The spectrum manager can then suggest that AP 602(3) provide the network and attempt to switch some of its network users (not shown) to the new network.

In either case, (whether AP initiated or spectrum manager initiated) assume for purposes of explanation, AP 602(3) successfully provides the new network and reports conditions at its location back to the spectrum manager 610 for inclusion in the dynamic database 608. In some implementations, use of the dynamic database or information thereof can be made conditional on the device providing conditions at its location. This location information can then be used to update the dynamic database 608.

Figure 7:
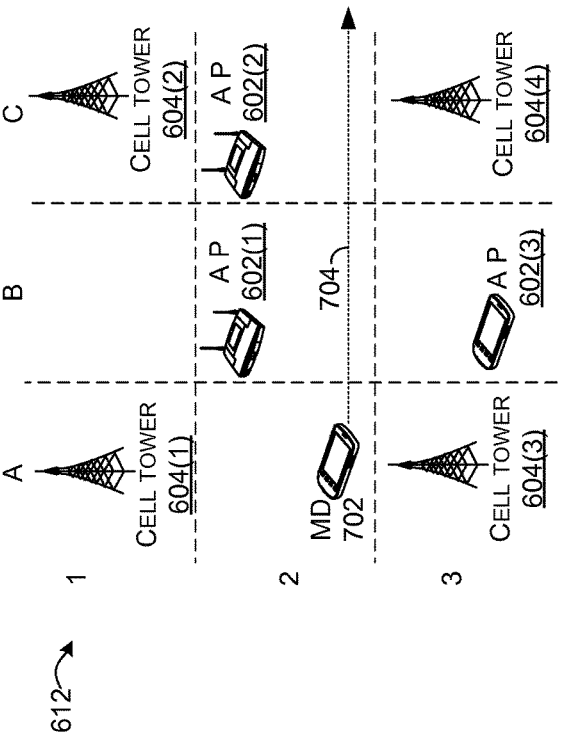

FIG. 7 shows a subsequent view of system 600. At this point, in dynamic database 608, location B3 is updated to reflect the new network established by AP 602(3) on radio white space channel 53. The additional information indicates that the new network expires in 24 hours.

Further, mobile device 702 is now in the grid of locations 612 at location A2. This is also reflected in the dynamic database 608 in row A2 under 'devices'. The mobile device 702 can use the dynamic database 608 to identify available networks at its location. Further, the mobile device can use the dynamic database to identify available channels at its location in the event that the mobile device wanted to function as an AP.

In this example, assume that the mobile device 702 is a smart phone that can determine its location and direction of movement. Assume further that the mobile device wants to utilize available networks to communicate data. At location A2 the dynamic database 608 indicates that only cellular networks are available. At this point, assume that the mobile device has a relationship with either SP1 or SP2 to allow the mobile device to use an individual cellular network. Assume further that the mobile device is moving from left to right on the printed page as indicated by arrow 704.

As the mobile device 702 moves toward location B2, the mobile device can access information from the dynamic database 608 relating to location B2. As such, the mobile device can be ready to handle network changes before they occur rather than reactively. In this case, the mobile device can determine from the dynamic database 608 that location B2 includes two networks provided by AP 602(1). Further, the Wi-Fi network on the 2.4 Gigahertz channel is experiencing high interference. As such, the mobile device may select to ping AP 602(1) on radio white space channel 51 in an attempt to authenticate to and use this network. The mobile device can switch some or all of its data communication to the new network. For instance, the mobile device may switch video streaming to the radio white space channel 51 and keep voice communication on the 4G network.

Further, as the mobile device 702 continues across location B2, the mobile device can obtain information about location C2 from dynamic database 608. As such, the mobile device can be ready to transition from the network on radio white space channel 51 to the network on radio white space channel 55. Further, in some cases the mobile device does not need to scan channels, it can simply get the information about the networks at the location. It can then ping the device indicated on the channel on the dynamic database's network listing (e.g., "AP 602(2)" on channel 55"). These features can avoid the issue of 'dropping' connections and then looking for a new connection. Instead, the mobile device can seamlessly transition with no interruption of service (or an interruption that is so short that it is likely imperceptible to the user).

Alternatively, the spectrum manager 610 can monitor the mobile device 702 and can send suggestions to the mobile device. For instance, when the mobile device is heading from location A2 to location B2, the spectrum manager can send information about the networks available at location B2 to the mobile device. Thus, the mobile device can be ready to ping AP 602(1) upon crossing from location A2 to location B2. Further, the spectrum manager 610 may make application specific recommendations. For instance, the spectrum manager may suggest that the mobile device switch video transfer to the radio white space channel 51 while maintaining the voice (e.g., phone) application on the 4G channel. Stated another way, the spectrum manager may separate the overall bandwidth usage of the mobile device into multiple portions and handle individual portions differently.

Similarly, as the mobile device approaches location C2, the spectrum manager 610 can provide information from the dynamic database 608 about the networks at this location. This information can allow the mobile device to make a seamless transition between networks. In a further implementation, the spectrum manager 610 and/or the mobile device may consider various parameters to accomplish 'smart transitions'. For instance, one parameter can relate to latency sensitivity. For example, voice communication tends to be latency sensitive (e.g., the user does not want to lose words during the conversation). On the other hand, video downloading tends to not be as sensitive because data communication can get ahead of data playback and content can be buffered or cached for a few seconds before it is played. Thus, the cache can potentially bridge any interruption in service so that playback is unaffected.

Thus, as the mobile device approaches the periphery of location B2, the mobile device 702 or the spectrum manager 610 may switch latency sensitive applications to 4G until the mobile device successfully transitions to the channel 55 network at location C2. Further still, the mobile device or the spectrum manager may attempt to temporarily increase the content in the mobile device's cache in preparation for the transition.

This is only one example of how the mobile device 702 or the spectrum manager 610 can facilitate a smart transition. For instance, in the video streaming example, the mobile device or the spectrum manager may cause different content to be streamed in the adjacent networks. For instance, in preparation for the transition, the mobile device may cache as much video content as possible. As the transition is accomplished, the mobile device may stream a specific subset of the video content on the new network for a short duration of time. For instance, the mobile device may begin by streaming only I-frames of the video content on the new network on radio white space channel 55. The I-frames in combination with the cached content can provide sufficient video quality and content to the user that the user does not notice the transition as the remaining video content is obtained on the new network.

Further still, in an instance where the mobile device 702 changes directions or gets close to location B3, the spectrum manager 610 can provide information about the networks in this location.

Additionally, while only a single mobile device 702 is illustrated, the spectrum manager can manage multiple devices on the grid of locations 612 and/or at individual locations. For example, in an instance where 10 mobile devices are at location C2, the spectrum manager may make suggestions to individual mobile devices to balance usage between the available networks. For example, initially the 4G and 2.4 channels may be crowded as per reports supplied by the mobile devices to the dynamic database 608. As such, the spectrum manager may attempt to transition increasing numbers of these mobile devices to the network provided by AP 602(2) on radio white space channel 55 until feedback indicates that some balance is being achieved between the available networks.

The spectrum manager 610 may take other actions to attempt to address the crowding. For instance, the spectrum manager may suggest to AP 602(2) to start another network on another available channel, such as channels 51 or 53. If the new network is established, the spectrum manager can attempt to transition some of the mobile devices to the new network.

The spectrum manager 610 may also allow the mobile devices to influence decisions regarding which networks are suggested for them. For instance, an individual mobile device may specify that maintaining quality of service is of higher importance to it (e.g. its user) than other factors. Another mobile device may weight cost as more important. For instance, in the latter case, the mobile device could be configured to (by itself or with the assistance of the spectrum manager) transition to any free network, whenever possible rather than utilizing an alternative network, such as a service provider's 4G network that could incur additional charges. Further, the transition of the mobile device to a new channel could be across all applications or different for different for different applications. For instance, the mobile device could be configured to transition all data transfer to free networks except voice which is to be maintained on the 4G network when available. Of course, individual mobile devices can decide what networks to use rather than relying on recommendations from the spectrum manager.

In a similar fashion, the service providers could influence how their networks and their customers' mobile devices are handled. For instance, the service provider could request the spectrum manager 610 transition their mobile devices off of their 4G networks, so long as quality of service parameters (between the service provider and the individual mobile device) are maintained.

As noted above, dynamic database 608 can contain information about any radio channels, not just those associated with specific technologies or entities. This information in the dynamic database can allow much more informed decisions about channel utilization than has previously been possible. For instance, a mobile device may be transitioned from 4G, to Wi-Fi, to another Wi-Fi, to a TV white space channel, and back to 4G in a seamless manner without any input or diminished service from a user perspective.

Further, the dynamic database 608 can enable resource sharing between service providers or other entities. For instance, the spectrum manager could transition the mobile device from a 4G network of a first service provider to a Wi-Fi network provided by a second service provider and back to the 4G network. The first and second service providers can reach some type of agreement, such as a reciprocity agreement to facilitate such use. The mobile device can be configured to implement the suggestions conveyed from the spectrum manager. Alternatively, the mobile device can be configured to access information from the dynamic database to make its own decisions rather than relying on the spectrum manager. In a similar manner, the APs can rely on the spectrum manager to make suggestions regarding channels to utilize for networks or individual APs can make their own decisions utilizing information from the dynamic database.

Further, while only a single AP is shown per location, in many scenarios, multiple APs may be positioned in a manner that provides overlapping network coverage. The dynamic database can avoid interruptions in service that might otherwise occur. For example, assume that the overlapping networks utilize radio white space channels and expire at a particular point in time. The information in the dynamic database can indicate when individual networks expire and allow the spectrum manager 610 to remind the AP to attempt to establish a new network (either on the same channel or a different channel) before the expiration. Further, the expiration of the overlapping networks can be evaluated to avoid a situation where the networks expire at the same time so that in the event one network goes down coverage is still supplied by the other network. Stated another way, in this example, the spectrum manager 610 can employ policies that produce staggered expirations of overlapping networks. Stated more broadly, the spectrum manager can utilize information in the dynamic database 608 to reduce the likelihood that multiple overlapping networks will become unavailable at the same time.

Figure 8:
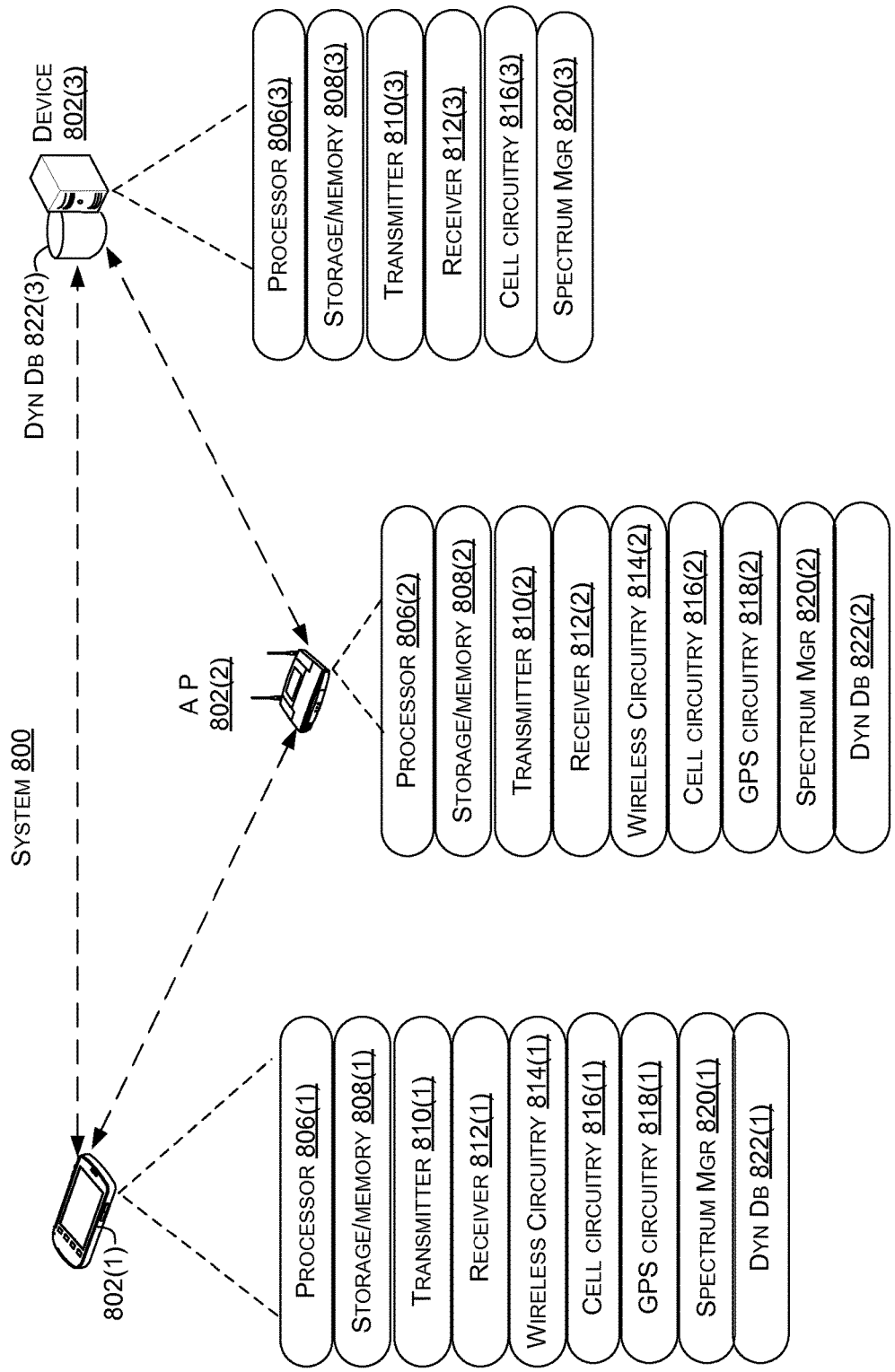

FIG. 8 shows system 800 that can enable the dynamic database concepts described above. Further, system 800 can include multiple devices 802 that can be similar to the devices described above. For example, device 802(1) can be similar to mobile device 202, 402, and/or 702. Further, device 802(2) can be similar to APs 102, 302, and/or 602. Device 802(3) can be a computing device that can be employed by various entities, such as regulatory database 104, intermediary 106, service provider 304, or a third party. (In this discussion, the use of a designator with the suffix, such as "(1)", is intended to refer to a specific device instance. In contrast, use of the designator without a suffix is intended to be generic). Of course, not all device implementations can be illustrated and other device implementations should be apparent to the skilled artisan from the description above and below.

Devices 802 can include several elements which are defined below. For example, these devices can include a processor 806 and storage/memory 808. The devices can also include (or be communicatively coupled with) a transmitter 810, a receiver 812, wireless circuitry 814, cell circuitry 816, GPS circuitry 818, a spectrum manager 820, and/or a dynamic database 822. The devices can alternatively or additionally include other elements, such as input/output devices (e.g., touch, voice, and/or gesture), buses, graphics cards, displays, etc., which are not illustrated or discussed here for sake of brevity.

The term "device", "computer", or "computing device" as used herein can mean any type of device that has some amount of processing capability and/or storage capability. Processing capability can be provided by one or more processors (such as processor 806) that can execute data in the form of computer-readable instructions to provide a functionality. Data, such as computer-readable instructions, can be stored on storage, such as storage/memory 808 that can be internal or external to the computer. The storage can include any one or more of volatile or non-volatile memory, hard drives, flash storage devices, and/or optical storage devices (e.g., CDs, DVDs, etc.), among others. As used herein, the term "computer-readable media" can include signals. In contrast, the term "computer-readable storage media" excludes signals. Computer-readable storage medium/media includes "computer-readable storage devices." Examples of computer-readable storage devices include volatile storage media, such as RAM, and non-volatile storage media, such as hard drives, optical discs, and flash memory, among others.

Examples of devices can include traditional computing devices, such as personal computers, desktop computers, servers, notebook computers, cell phones, smart phones, personal digital assistants, pad type computers, mobile computers, cameras, routers, or any of a myriad of ever-evolving or yet to be developed types of computing devices. A mobile computer can be any type of computing device that is readily transported by a user and may have a self-contained power source (e.g., battery).

In the illustrated implementation, devices 802 are configured with a general purpose processor 806 and storage/memory 808. In some configurations, a device can include a system on a chip (SOC) type design. In such a case, functionality provided by the device can be integrated on a single SOC or multiple coupled SOCs. One or more processors can be configured to coordinate with shared resources, such as memory, storage, etc., and/or one or more dedicated resources, such as hardware blocks configured to perform certain specific functionality. Thus, the term "processor" as used herein can also refer to central processing units (CPU), graphical processing units (CPUs), controllers, microcontrollers, processor cores, or other types of processing devices suitable for implementation both in conventional computing architectures as well as SOC designs.

In some configurations, the spectrum manager 820 can be installed as hardware, firmware, or software during manufacture of the device 802 or by an intermediary that prepares the device for sale to the end user. In other instances, the end user may install the spectrum manager 820, such as in the form of a downloadable application.

The transmitter 810 and the receiver 812 can function to transmit and receive data at various channels. For example, the transmitter 810 and the receiver 812 can be configured to operate at specific channels, such as 2.4 Giga Hertz channel, 5.0 Giga Hertz channel, 60 Giga Hertz channel, radio channels, and/or TV channel channels (50 Mega Hertz to 810 Mega Hertz), among others. Alternatively, the transmitters and receivers can be configured to tune to any channels in the RF spectrum. While discrete components or elements are illustrated, some implementations may combine elements. For instance, wireless circuitry 814 may include dedicated transmitters and receivers rather than interfacing with distinct transmitters and receivers.

Relative to device 802(1), the spectrum manager 820(1) can utilize the GPS circuitry 818(1) to determine its location. Alternatively or additionally to GPS location identification, the spectrum manager can cause triangulation (such as cell tower triangulation or Wi-Fi access point triangulation) to be performed to determine its location. The spectrum manager can identify an interface to access the dynamic database 822(3) with the location information. For instance, the spectrum manager can access the Internet and utilize a uniform resource identifier (URI) of the dynamic database to obtain a set of location specific radio white space channels. Any type of wired or wireless interface can be utilized to allow a device to communicate with a remote dynamic database, such as dynamic database 822(3). For instance, the interface may be a cellular data channel, a cellular control channel, a Wi-Fi network to a wire (e.g., fiber optic line), etc. Note also that devices, such as devices 802(1) and 802(2), can include a local or customized copy of the dynamic database 822(1) and 822(2), respectively.

From the mobile device 802(1)'s perspective, the local spectrum manager 820(1) can track individual channels and/or interfaces, such as Bluetooth channels, Wi-Fi channels, radio white space channels, and cell service, among others that are available to the device 802(1). In some configurations, the spectrum manager 820(1) can store the information locally along with any respective additional information and/or provide this information to the remote dynamic database 822(3).

The local spectrum manager 820(1) and/or the remote spectrum manager 820(3) can select individual channels or services for use by the device 802(1). The spectrum manager can then cause the transmitter 810(1), receiver 812(1), wireless circuitry 814(1), and/or cell circuitry 816(1) to facilitate communication over the selected channel/service. In this way, the spectrum manager can provide a spectrum manager functionality and can cause the channels/services to be cached in the dynamic database 822(1). In other cases, the mobile device can be configured more as a thin client which reports information about its location to a remote spectrum manager (such as spectrum manager 820(3)). The remote spectrum manager can store the information in dynamic database 822(3). The remote spectrum manager can analyze information in the dynamic database. The remote spectrum manager can then make a suggestion (e.g., instructions) to the mobile device 802(1) via an interface, such as a cellular control channel. The mobile device can have an short message service (SMS) code stack that executes the instructions and causes the mobile device to implement the suggestion.

Relative to device 802(3), the spectrum manager 820(3) can obtain location-specific radio white space channel data from regulatory database 104 (FIG. 1). The spectrum manager 820(3) can store the location-specific radio white space channel data in the dynamic database 822(3). The spectrum manager 820(3) can store information about other radio channels in the dynamic database. The spectrum manager 820(3) can gather and store additional information in the dynamic database 822(3). In some configurations, the spectrum manager 820(3) can track mobile devices and/or APs and correlate the location of individual devices with available channels and networks.

Spectrum manager 820(3) can also receive feedback from individual devices, such as devices acting as client devices and devices acting as APs and store the feedback in the dynamic database 822(3). The feedback information can be utilized by the spectrum manager 820(3) to make recommendations to individual APs and client devices regarding selection of channels and/or networks.

Further, in some cases, the spectrum manager 820 can track usage of individual resources and make recommendations to mobile devices based upon the tracked usage. For instance, the spectrum manager may monitor data usage by the mobile device utilizing a specific technology, such as a cell data plan. In an instance where the rate of use and/or total use is high such that the device may exceed its data plan and incur additional expenses, the spectrum manager 820 may suggest that the mobile device switch to a radio white space channel network or other network based upon the mobile device's location and feedback from (or proximate to) the location.

In other cases, the spectrum manager 820 may consider the resources of the service provider. For example, in an instance where a cell tower or other resource servicing device 802(1) is operating above a threshold value, the spectrum manager 820(3) may suggest to the spectrum manager 820(1) of the device to conduct some or all of its data communication over an alternative channel. The spectrum manager 820(3) may even offer an incentive to the spectrum manager 820(1) to make such a switch. For example, if the mobile device switches for a period of time from using the cell resources to radio white space resources, the spectrum manager 820(3) may give a cash or data credit for future use on the device's data plan. Thus, the spectrum manager 820(3) can reduce congestion on the service provider's resources (e.g., cell towers, satellites, etc.) by causing some of the devices using the congested resources to other available networks.

The spectrum manager 820 may make a similar arrangement with APs. For instance, spectrum manager 820(3) may offer an incentive to AP 802(2) if the AP provides information to the spectrum manager and allows the spectrum manager to direct mobile devices to the AP. For instance, AP 802(2) could be a third party AP that is not associated with a cellular service provider. The spectrum manager 820(3) may offer the AP a cash or other incentive if the spectrum manager can direct mobile device communications to the AP in the event that other available networks, such as 4G networks are operating above a threshold level.

Note that the discussion above performs functions based upon a location of a device, such as a mobile device. The implementations, can be accomplished while protecting the user's security, privacy, and personal information. For instance, before gathering any information from the user's device a GUI can be presented to the user on their device's display. Visual content of the GUI can explain the types of information that are gathered and define and/or limit the use of the information. The user can be given the opportunity to participate or to not participate. Even when the user elects to use the discussed functionalities, accepted practices can be followed to protect the user.

Method Examples

Figure 9:
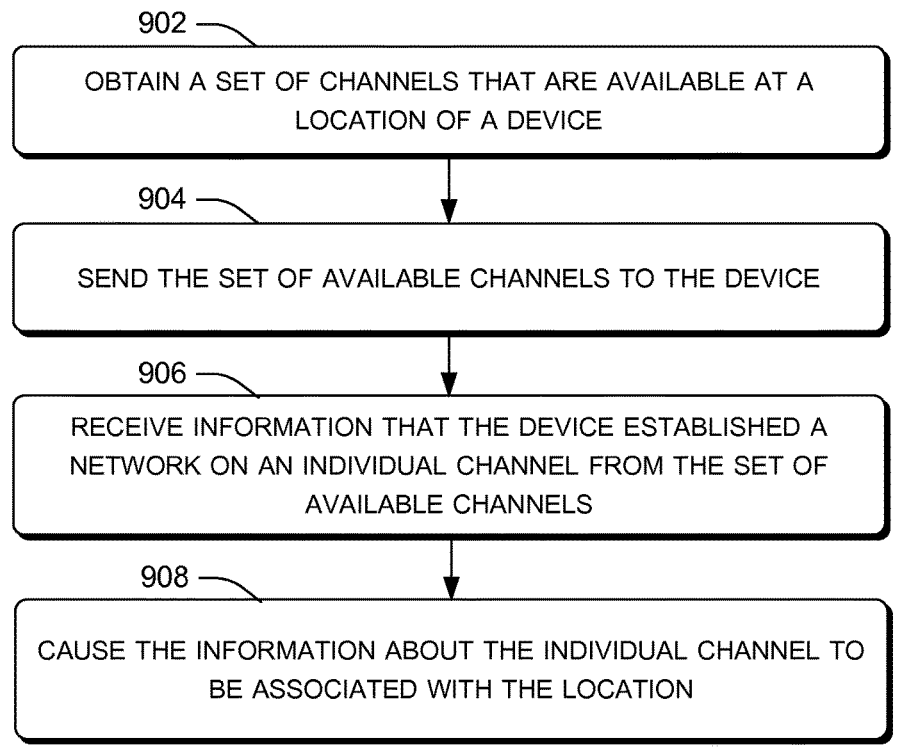
FIGS. 9-13 are flowcharts of examples of radio channel utilization techniques in accordance with some implementations of the present concepts.

FIG. 9 shows a method 900 for utilization of radio channels.

The method can obtain a set of channels that are available at a location of a device at 902. In some cases, the device can query with its location for the status of channels at the location. Thus, the obtaining can be performed responsive to receiving the query. In one of these cases, the query is directed to a cellular service provider associated with the device. In another case, the location of the device can be monitored and the status of the channels can be obtained in an attempt to enhance one or more aspects of channel utilization at the location. In one such scenario, the cellular service provider can monitor the device and obtain the status of channels for the device. In another case, a third party can monitor the device and/or the location. The status can be obtained from a database or multiple databases.

In some cases, the cellular service provider, a governmental or quasi-governmental entity, and/or the third party can maintain the database. Some implementations can involve multiple databases. For instance, a regulatory database may include some channel information. This information can be synchronized into another database (e.g., dynamic database) that is also populated with additional information. A single entity may monitor the devices and maintain the database or one entity may maintain the database and another entity may monitor the devices. In still another implementation, cellular service providers may maintain their own dynamic databases and employ a spectrum manager to manage devices and the dynamic database.

The method can send the set of available channels to the device at 904. The set of available channels can include radio white space channels, Wi-Fi channels, cellular channels, etc. The method can also send additional information about the channels. For instance, the additional information can indicate levels of interference on individual channels, networks established on individual channels, constraints associated with use of individual channels, etc. From one perspective the additional information can entail any information that can be useful for deciding what channels to utilize and how to utilize them.

The method can receive information that the device established a network on an individual channel from the set of available channels at 906. In some cases, the device can establish the network utilizing multiple channels that include the individual channel.

The method can cause the information about the individual channel to be associated with the location at 908. This received information (e.g., feedback) can be added to the database to further enhance understanding of the channel at the location. This information can be utilized in various ways. For instance, another or second device may query from the same (or a proximate) location. For example, the second device may want to communicate data over a network at the location. The information about the network (and/or other database information) can be provided to the second device. The network information can allow the second device to authenticate and utilize the network more quickly and easily than would otherwise be the case.

Of course, only a few devices are described here for sake of brevity, but many devices can be monitored. Some devices may be attempting to establish a network on an available channel(s) while another device may be attempting to utilize an existing network. Of course, a single device can both establish networks and utilize networks. For instance, a smart phone can communicate data over various channels. The smart phone can also function as an AP and establish a network.

Figure 10:
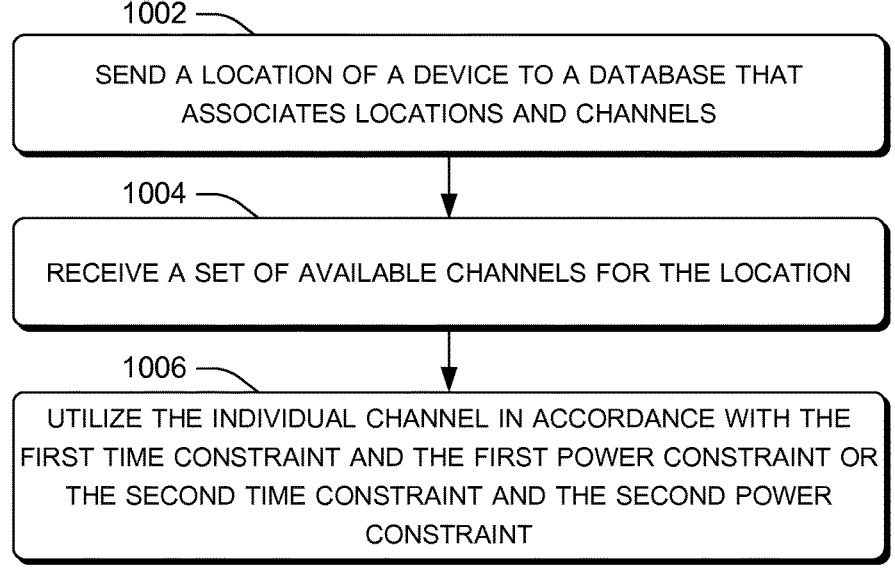

FIG. 10 shows a method 1000 for utilization of radio channels.

The method can send a location of a device to a database that associates locations and channels at 1002. The database can be a regulatory database or a database maintained by an intermediary that is synchronized to the regulatory database.

The method can receive a set of available channels for the location at 1004. For instance, an individual available channel can be associated with a first time constraint and a first power constraint and a second time constraint and a second power constraint. In some configurations, the constraints can be fixed. In other configurations the constraints can be negotiable. For instance, the constraints for a given channel may be power x for one hour or power y for ten hours. Alternatively, the device may request to use a channel for a time constraint of ten minutes. An entity associated with the database may offer a set of constraints based upon the requested constraint. The device can counter the set of constraints to satisfy its use. Use of the channel can commence once an agreement is reached. This configuration can more efficiently match available spectrum with use. Stated another way, this configuration can reduce tying up channels to a greater extent than a requested or intended use.

The method can utilize the individual channel in accordance with the first time constraint and the first power constraint or the second time constraint and the second power constraint at 1006. In some cases, the utilization can entail establishing a network on the individual channel. In other cases, the utilization can entail attempting to identify a network on the individual channel and communicating data over the network in accordance with the first time constraint and the first power constraint or the second time constraint and the second power constraint.

Figure 11:
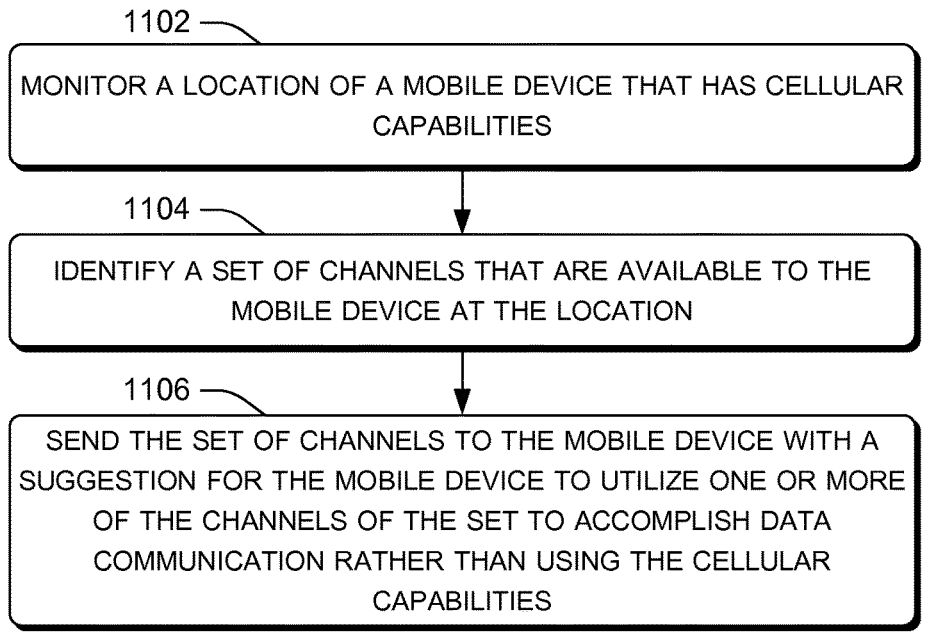

FIG. 11 shows a method 1100 for utilization of radio channels.

The method can monitor a location of a mobile device that has cellular capabilities at 1102. The cellular capabilities of the mobile device can include a data channel and a control channel. In some configurations, the sending can be accomplished over the data channel. In other cases, the sending can be accomplished over the control channel. In still other cases, the sending can be accomplished over another wired or wireless interface.

The method can identify a set of channels that are available to the mobile device at the location at 1104.

The method can send the set of channels to the mobile device with a suggestion for the mobile device to utilize one or more of the channels of the set to accomplish data communication rather than using the cellular capabilities at 1106. The suggestion can relate to data communication by the mobile device as a whole or the suggestion can relate to specific applications on the mobile device. In some cases, the suggestion can include information about networks available on individual channels so that the mobile device can more readily utilize a network for data communication. The method can be dynamic and continue to monitor the mobile device to provide additional suggestions, such as when data communication on the device changes or when networks expire or become crowded. Further, the monitoring can detect movement of the mobile device to a second location. The method can then send another set of channels to the mobile device for use at the second location.

Figure 12:
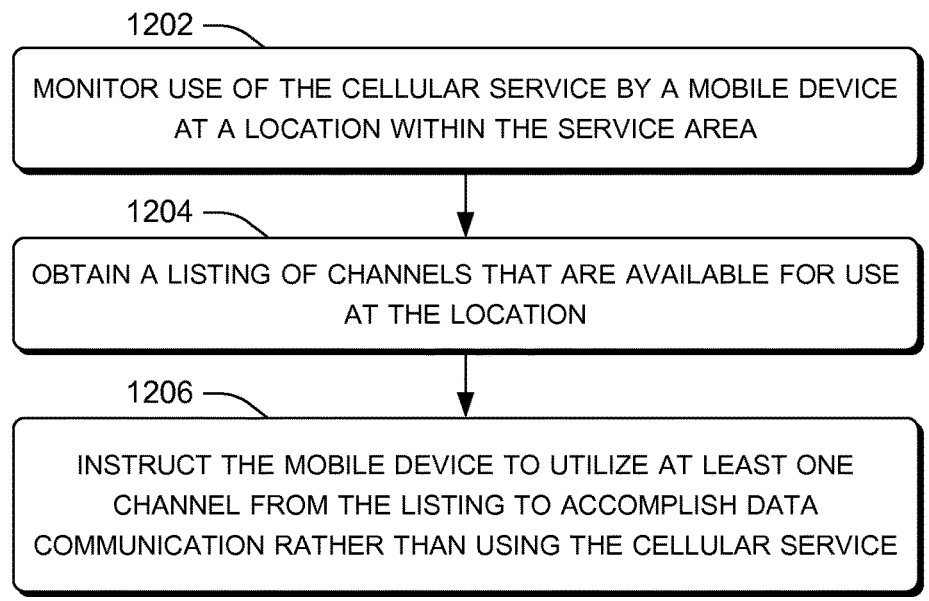

FIG. 12 shows a method 1200 for utilization of radio channels.

The method can monitor use of cellular service by a mobile device at a location within a service area at 1202.

The method can obtain a listing of channels that are available for use at the location at 1204.

The method can instruct the mobile device to utilize at least one channel from the listing to accomplish data communication rather than using the cellular service at 1206. This method can allow for more efficient use of the radio spectrum in that cell networks tend to be some of the most highly utilized networks while other channels go underutilized. The method can automatically transition some of the cell traffic to other channels in a manner that can be beneficial to the mobile device user (such as from a cost and/or performance perspective) and from the cell service provider perspective.

Figure 13:
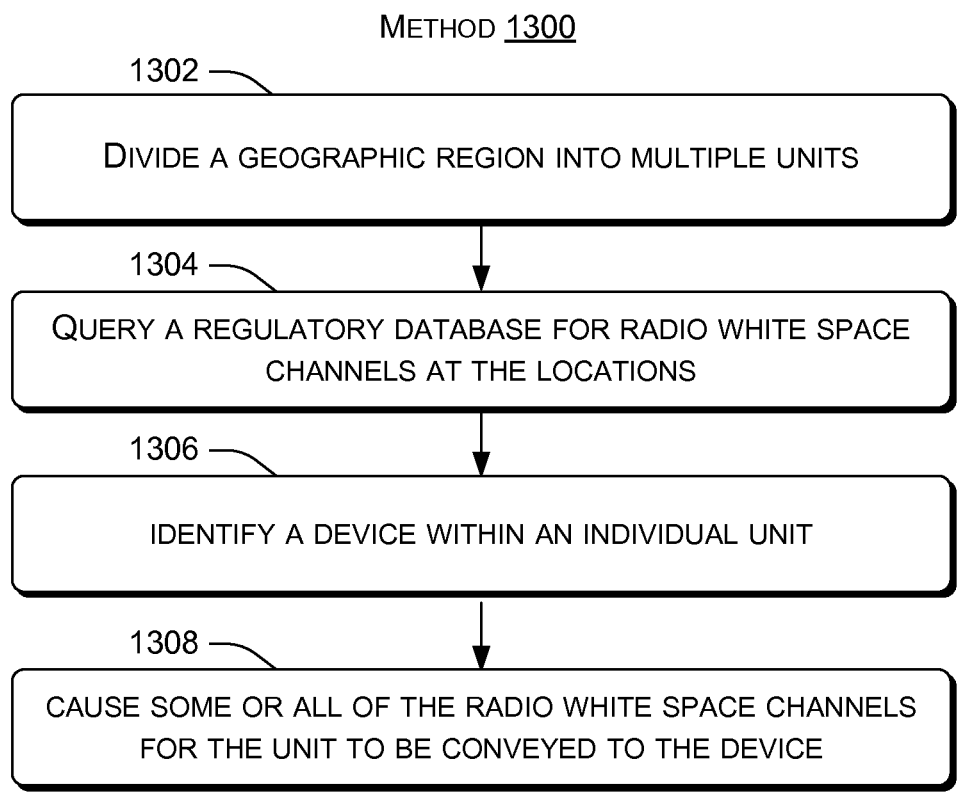

FIG. 13 shows a method 1300 for utilization of radio channels. Specifically, this method relates to managing radio white space channels in a geographic region. In one example, the geographic region may be a service area where a service provider offers wireless services, such as cellular service.

The geographic region can be divided into multiple units at block 1302. The size of the units can be selected at least in part, based upon constraints imposed by a radio white space database that covers some or all of the geographic region. For instance, if the regulatory database requires that the location of any device utilizing the radio white space channels be known to within a certain accuracy, such as 100 meters, then a radius of the units may be 50 meters or some other value that complies with the accuracy constraint.

In one case, the geographic region may be divided into a set of cells. A cell tower can be positioned in each cell to provide cellular service within the cell. Assume for ease of explanation that the cells have a radius of 1 mile. Individual cells can be further divided into the units. For instance, there might be several tens or hundreds of units within an individual cell. In this example, assume that each unit has a radius of 50 meters and the location of the center of each cell is known within a few meters.

The regulatory database can be queried for radio white space channels at (at least some of) the locations at block 1304. In some cases, this querying can be performed in a manner that staggers authorization of individual channels. For instance, assume that a set of radio white space channels available for a location in one of the units entails channels 1-8 and that the time constraint associated with use of the channels is 24 hours. At time zero, the method can query for channels 1 and 2. At time six hours, the method can query for channels 3 and 4. At time 12 hours, the method can query for channels 5 and 6, etc. Thus, not all of the channels of the set will expire at the same time.

The method can identify a device within an individual unit at 1306. Of course, while a single device is described, the method can involve multiple devices at an individual unit and/or multiple devices spread over multiple units. The devices may be devices, such as an AP that are configured to establish networks on the radio white space channels. Alternatively, the devices may be devices that can utilize a network that is utilizing one or more of the radio white space channels. Of course, some devices, such as smart phones, tablets, and notebook computers, may perform both roles. The devices may be relatively permanent, such as a router in a coffee shop or relatively transitory, such as a user and his/her pad type computer visiting the coffee shop. Identifying the device may be initiated by the device, such as by the device supplying its location. Alternatively, the identifying may be initiated by the service provider or another entity.

The method can cause some or all of the radio white space channels for the unit to be conveyed to the device at 1308. In some cases, the service provider can convey the radio white space channels to the device via a cellular data channel or a cellular control channel. For instance, the cell tower of the cell in which the unit is located can convey the radio white space channels. In other cases, the service provider can upload the radio white space channel information for the geographical region to a satellite. For instance, each time the service provider queries the regulatory database (e.g., at time zero, six hours, twelve hours, etc.) the service provider can upload this information to the satellite. Using this staggered approach can ease the upload bandwidth burden when compared to uploading all of the information to the satellite at once. The satellite can download information that relates to individual units to devices in those units. In some cases, the radio white space channels can be provided to the device and the device can decide whether to use the radio white space channels. In other cases, the radio white space channels can be conveyed to the device along with instructions to utilize one or more of the radio white space channels to accomplish some or all of its data communications using the radio white space channels.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio channels are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
   monitoring a direction of movement of a mobile device from a first location, the mobile device having cellular capabilities;
   based at least in part on the direction of movement of the mobile device, determining a second location and an anticipated arrival time of the mobile device at the second location;
   identifying channel information associated with a set of channels available to the mobile device at the second location at the anticipated arrival time, the channel information including expiration times of networks on the set of channels;
   prior to arrival of the mobile device at the second location, based at least in part on the anticipated arrival time of the mobile device and the expiration times of the networks, contacting an access point at the second location regarding establishment of a new network on a particular channel of the set, the new network being available to the mobile device at the anticipated arrival time; and,
   sending a channel suggestion of the particular channel to the mobile device for the mobile device to use the new network for data communication upon arrival at the second location.

2. The method of claim 1, wherein the method further comprises:
   evaluating the expiration times for overlapping network coverage at the anticipated arrival time; and,
   contacting the access point regarding the establishment of the new network responsive to determining that the new network is needed to maintain the overlapping network coverage at the anticipated arrival time.

3. The method of claim 1, wherein the channel suggestion relates to specific applications of the mobile device or wherein the channel suggestion relates to all data communication of the mobile device.

4. The method of claim 1, wherein the first location and the second location are within range of a single cell tower.

5. The method of claim 1, further comprising:
   prior to arrival of the mobile device at the second location, determining a change of direction of the mobile device; and,
   determining an updated second location in response to the change in direction.

6. The method of claim 5, further comprising:
   providing an updated channel suggestion to the mobile device in response to determining the updated second location.

7. The method of claim 1, wherein the mobile device is operating on battery power, and wherein the sending the channel suggestion to the mobile device reduces an amount of the battery power used by the mobile device over the mobile device having to scan to find available channels.

8. The method of claim 1, wherein the identifying comprises identifying the set of channels in a database that associates locations and channels and further comprising receiving observed information about the set of channels from the mobile device and updating the database with the received observed information.

9. The method of claim 8, further comprising sending the channel suggestion to the mobile device in exchange for the observed information.

10. The method of claim 1, further comprising accessing a database that associates geographic locations and channels.

11. The method of claim 10, wherein the database is maintained by a cellular service provider.

12. The method of claim 10, further comprising maintaining the database.

13. The method of claim 12, further comprising synchronizing the database with a regulatory database that associates the geographic locations and the channels, the channels being radio white space channels.

14. A system, comprising:
multiple cell towers configured to cooperatively provide cellular service in a service area; and,
at least one computing device configured to:
monitor use of the cellular service by a mobile device and monitor a direction of movement of the mobile device from a first geographic location toward a second geographic location within the service area,
based at least in part on an anticipated arrival time of the mobile device at the second geographic location, obtain a listing of channels available for use at the anticipated arrival time at the second geographic location,
prior to arrival of the mobile device at the second geographic location, send content relating to individual channels from the listing to the mobile device, the content including time limits of availability of networks on the individual channels, and,
instruct the mobile device to, as the mobile device approaches the second location, utilize at least one of the individual channels from the listing to accomplish non-cellular data communication while maintaining cellular voice communication on the cellular service.

15. The system of claim 14, wherein the first geographic location and the second geographic location are within range of a single cell tower of the multiple cell towers within the service area.

16. The system of claim 14, wherein the at least one computing device is further configured to:
maintain the listing of channels; and
synchronize the listing of channels with a regulatory database that associates geographic locations and radio white space channels.

17. The system of claim 14, wherein the system is further configured to receive information relating to the at least one of the individual channels from the mobile device and to update the listing with the received information.

18. The system of claim 14, wherein the monitoring the direction of movement further comprises monitoring a change in direction of the mobile device.

19. A system, comprising:
a processing device; and
a storage device storing computer-executable instructions which, when executed by the processing device, cause the processing device to:
monitor a direction of movement of a mobile device from a first geographic location toward a second geographic location;
based at least in part on the direction of movement of the mobile device, obtain a listing of channels at the second geographic location and expiration times of networks on the channels;
based at least in part on the expiration times, determine individual channels that have networks available to the mobile device at an anticipated time of arrival of the mobile device at the second geographic location;
send content relating to the individual channels to the mobile device, the content including time constraints on use by the mobile device of the networks; and,
instruct the mobile device to, upon arrival at the second geographic location, utilize at least one of the individual channels.

20. The system of claim 19, wherein the first geographic location and the second geographic location are within a service area of a cell tower.

21. The system of claim 19, wherein the computer-executable instructions further cause the processing device to:
continue to monitor further movements of the mobile device; and,
provide an updated channel suggestion to the mobile device based on the further movements.

22. The system of claim 19, wherein the at least one of the individual channels is a radio white space channel with an established network that covers the second geographic location within a service area to which the mobile device is moving.

* * * * *